United States Patent
Johnson et al.

(10) Patent No.: US 6,917,497 B1
(45) Date of Patent: Jul. 12, 2005

(54) DISK DRIVE ACTUATOR ARM LATCH ASSEMBLY

(75) Inventors: Gale D. Johnson, Loveland, CO (US); James A. Dunckley, Boulder, CO (US); D. Michael Keffeler, Longmont, CO (US)

(73) Assignee: Maxtor Corporation, Longmont, CA (US)

( * ) Notice: Subject to any disclaimer, the term of this patent is extended or adjusted under 35 U.S.C. 154(b) by 185 days.

(21) Appl. No.: 10/054,376

(22) Filed: Jan. 22, 2002

Related U.S. Application Data

(60) Provisional application No. 60/269,622, filed on Feb. 16, 2001.

(51) Int. Cl.[7] .............................................. G11B 21/22
(52) U.S. Cl. .................................................... 360/256.4
(58) Field of Search ............................. 360/256, 256.1, 360/256.2, 256.3, 256.4, 256.5, 256.6

(56) References Cited

U.S. PATENT DOCUMENTS

| | | | | |
|---|---|---|---|---|
| 4,654,735 A | * | 3/1987 | Izraelev et al. | 360/256 |
| 4,725,907 A | * | 2/1988 | Jue | 360/256.3 |
| 4,796,130 A | * | 1/1989 | Shimanuki | 360/256.3 |
| 4,868,695 A | * | 9/1989 | Quatro et al. | 360/256.3 |
| 5,162,959 A | * | 11/1992 | Arin et al. | 360/256.3 |
| 5,189,576 A | | 2/1993 | Morehouse et al. | 360/105 |
| 5,296,986 A | | 3/1994 | Morehouse et al. | 360/106 |
| 5,404,257 A | * | 4/1995 | Alt | 360/256.4 |
| 5,483,399 A | * | 1/1996 | Jeong et al. | 360/256.2 |
| 5,612,842 A | * | 3/1997 | Hickox et al. | 360/256.4 |
| 5,623,384 A | * | 4/1997 | Hickox et al. | 360/256.4 |
| 5,636,090 A | * | 6/1997 | Boigenzahn et al. | 360/256.4 |
| 5,671,104 A | * | 9/1997 | Takahashi et al. | 360/256.3 |
| 5,694,271 A | * | 12/1997 | Stefansky | 360/256.3 |
| 5,812,345 A | * | 9/1998 | MacPherson et al. | 360/256.3 |
| 5,982,586 A | * | 11/1999 | Scura | 360/256.3 |
| 6,011,672 A | * | 1/2000 | Matsumoto | 360/265.1 |
| 6,088,193 A | * | 7/2000 | Misso et al. | 360/256.2 |
| 6,134,077 A | * | 10/2000 | Misso et al. | 360/256 |
| 6,327,119 B1 | * | 12/2001 | Barina et al. | 360/256.4 |
| 6,507,461 B1 | * | 1/2003 | Kimura et al. | 360/256.4 |
| 2002/0114097 A1 | * | 8/2002 | Kim | 360/75 |

* cited by examiner

Primary Examiner—William J. Klimowicz
(74) Attorney, Agent, or Firm—Marsh Fischmann & Breyfogle LLP

(57) ABSTRACT

An actuator arm latch assembly for a disk drive is disclosed which restrains movement of a disk drive actuator arm assembly during exposure of the disk drive to a shock event. In one embodiment, the actuator arm latch assembly is activated by the disk drive being exposed to a shock event that is directed along/about a first shock axis (e.g., within a reference plane that contains a disk drive base plate), and also is activated when the disk drive is exposed to a shock event that is directed along/about a second shock axis that is both non-parallel and non-colinear with the first shock axis (e.g., within a reference plane that is disposed at an angle to the disk drive base plate, and including perpendicular thereto).

85 Claims, 10 Drawing Sheets ns of this
DISK DRIVE ACTUATOR ARM LATCH ASSEMBLY

RELATED APPLICATIONS

This patent application claims priority from U.S. patent application Ser. No. 60/269,622, that was filed on Feb. 16, 2001, and that is entitled "LATCH FOR ALL AXES SHOCK AND VIBRATION PROTECTION." The entire disclosure of U.S. patent application Ser. No. 60/269,622 is incorporated by reference herein.

FIELD OF THE INVENTION

The present invention generally relates to disk drives and, more particularly, to an actuator arm latch assembly that moves between non-latching and latching positions to attempt to restrain movement of an actuator arm assembly when the disk drive is exposed to a shock event, typically during a non-operational mode.

BACKGROUND OF THE INVENTION

Data is stored on disk drives utilizing a variety of designs. In one design, a transducer is mounted on a slider that flies or rides on an air bearing or a thin layer of air that is disposed adjacent to a rapidly rotating computer readable disk media (hereafter data storage disk) as the data is transferred between the transducer and the corresponding data storage disk. Collectively, the slider and transducer may be referred to as a head. In any case, the slider is mounted on a suspension or a load beam, that in turn is mounted on a rigid actuator arm or an actuator arm tip of what may be characterized as an actuator arm assembly that is movably interconnected with a disk drive base plate and/or cover. Multiple data storage disks may be utilized by a given disk drive, in which case the actuator arm assembly would include multiple actuator arms/actuator arm tips for mounting multiple suspensions and heads. In any case, the actuator arm assembly moves the various transducers across the corresponding data storage disk in a desired manner and to a desired location on the data storage disk to read and/or write data.

Two types of actuator arm assemblies that are commonly used to move the transducer(s) to the desired location on the corresponding data storage disk are a linear actuator arm assembly and a rotary actuator arm assembly. Linear actuator arm assemblies move at least generally linearly during transition of the transducer(s) across the corresponding data storage disk. Rotational actuator arm assemblies pivot about an axis to transition the transducer(s) across the surface of the corresponding data storage disk along an arcuate path.

When the disk drive is not in operation, the actuator arm assembly may be moved such that its transducer(s) is in a "parked position" that is typically removed or displaced from the data storage area of the corresponding data storage disk. This reduces the potential for damage to the data storage disk(s) and/or transducer(s) In the event that the disk drive is subject to a non-operational shock event or force. In a first type of disk drive, known in the art as a "dynamic load/unload" disk drive, the actuator arm assembly is pivoted to position its transducer(s) to a "parked position" that is located beyond a perimeter of the corresponding data storage disk. In a second type of disk drive, known in the art as a "contact start/stop" disk drive, the actuator arm assembly moves the actuator arm and its transducer(s) to a "parked position" that is located directly on a non-data zone of the corresponding data storage disk, typically near the center of the corresponding data storage disk. In either case, when the disk drive is not operating and if/when the disk drive is exposed to a shock event or force, it is desirable in most cases to at least attempt to retain the actuator arm assembly in the "parked position" to reduce the potential for undesired contact between its transducer(s) and the data storage zone of the corresponding data storage disk.

Various types of latches have been proposed to attempt to retain the actuator arm assembly in the parked position when the disk drive is exposed to shock event or force in a non-operational mode. However, no known latches of this general type effectively handle the desired latching function for a shock event that is totally or at least has a primary component within the "x-y" dimension (e.g., within or parallel to a reference plane that contains the disk drive base plate or within or parallel to a reference plane(s) in which the actuator arm assembly moves during normal disk drive read/write operations), as well as a shock event that is within or at least has a primary component the "z" dimension (e.g., the largest force component being normal to the disk drive base plate or to a reference plane in which the actuator arm assembly moves during read/write operations).

SUMMARY OF THE INVENTION

The present invention generally relates to a disk drive that includes an actuator arm latch assembly that is typically functional only when the disk drive is in a non-operational mode or after its head or heads have been "parked." The various actuator arm latch assemblies to be described herein may be appropriate for contact start/stop disk drive designs, as well as for dynamic load/unload disk drive designs.

In relation to an apparatus in accordance with the present invention, each of the various aspects to be discussed in more detail below generally includes an appropriate housing (e.g., a base plate and/or cover that collectively define an enclosed space or the like). At least one data storage disk is interconnected with this housing in a manner so as to allow each data storage disk to move (e.g., rotate) relative to the housing in a desired manner. That is, the present invention is applicable to disk drives having only a single data storage disk, as well as disk drives having a multiple data storage disk configuration and which are typically mounted on a common spindle motor or the like. An actuator arm assembly is also interconnected with the noted housing in a manner so as to allow the actuator arm assembly to move relative to the housing in a desired manner. At least one transducer is appropriately interconnected with the actuator arm assembly (e.g., via a suspension or load beam that extends from an rigid actuator arm or actuator arm tip or E block, and a slider that is mounted on the free end of this suspension or load beam and which includes the noted transducer). Typically, there will be a transducer for each data storage surface of each data storage disk utilized by the disk drive, although such is not required by the broadest aspects of the present invention. In any case, an actuator arm drive assembly appropriately interfaces with the actuator arm assembly in a manner so as to be able to move the actuator arm assembly and each transducer that is interconnected therewith to a desired position (e.g., in relation to a given transducer's corresponding data storage disk for exchange of a signal therebetween, such as for purposes of a read and/or write operation).

A first aspect of the present invention is a disk drive in accordance with the above-noted general disk drive configuration. In the first aspect of the present invention, the actuator arm assembly is interconnected with the disk drive's housing by an actuator arm pivot. This is commonly referred to as a rotary type actuator arm assembly. That is, the actuator arm assembly in the case of the first aspect rotates or pivots relative to the housing to move any transducer interconnected therewith "across" the corresponding data storage disk to a desired position. The actuator arm latch assembly includes a latch pivot and a first latch member that is mounted on this latch pivot. The latch pivot is oriented in non-parallel relation to the actuator arm pivot. That is, a central reference axis along which the actuator arm pivot extends and a central reference axis along which the latch pivot extends are not parallel to each other in the case of the first aspect. Mounting the first latch member on a latch pivot of this orientation allows the same to move into engagement with the actuator arm assembly to restrain movement of the actuator arm assembly in response to a shock event or force having at least a primary component that is within or parallel to the "x-y" dimension (meaning at least generally parallel with the base plate or to the motion of the actuator arm assembly as it moves the transducer(s) across the corresponding data storage disk), as well as to a shock event or force having at least a primary component that is within the "z" dimension (meaning perpendicular to the noted "x-y" dimension).

Various refinements exist of the features noted in relation to the subject first aspect of the present invention. Further features may also be incorporated in the subject first aspect of the present invention as well. These refinements and additional features may exist individually or in any combination. The above-noted position of the latch pivot relative to the actuator arm pivot may be used to allow a latch on the first latch member to pivot in what may be characterized as an at least generally "upward"direction to engage the actuator arm assembly to provide the desired latching function. Consider the case where the housing includes a base plate and a cover that is interconnected with the base plate to define an enclosed space of sorts for the disk drive components. The latch pivot may be oriented such that the latch on the first latch member moves at least generally away from the base plate and into the path of the actuator arm assembly to provide the desired latching function. In this characterization, the latch also would be disposed further from the base plate when the first latch member was in a latching position than when the first latch member was in a non-latching position. The motion of the first latch member that results from the relative positions of the actuator arm pivot and the latch arm pivot also may be characterized as being non-parallel with the motion of the actuator arm assembly as it moves its transducer(s) across its corresponding data storage disk. In one embodiment, the actuator arm pivot and latch arm pivot are disposed within reference planes that are at least generally perpendicular to each other, such that the reference plane in which the actuator arm assembly moves is also at least generally perpendicular to the reference plane in which the first latch member moves to provide the desired latching function.

The first latch member of the subject first aspect may include a first cup and a first inertial mass that is at least partially disposed within this first cup. In one embodiment, the first cup engages an upper portion of the first inertial mass, such that the first cup may be characterized as projecting toward a base plate of the disk drive or in a downward direction. Movement of the first inertial mass relative to its corresponding cup may be used to pivot the first latch member in the above-described manner to provide the desired latching function for the actuator arm assembly. Various details may be incorporated into the design of the first cup to address the operation of or to "tune" the actuator arm latch assembly. For instance, the height or vertical extent of the first cup may be defined by a plurality of annular rings or facets of sorts that are disposed at different slopes or angles. As such, a given relative movement of the first inertial mass relative to the first cup within the noted "x-y" dimension may produce different amounts of movement of the first cup in the noted "z" dimension to provide the desired latching function depending upon which of the annular rings or facets the first inertial mass is principally acting upon to pivot the first latch member to provide the desired latching function.

In one embodiment of the subject first aspect, the actuator arm assembly latch further includes a second latch member that is stationary or that does not move relative to the first match member. This may be done by fastening the second latch member to the housing (e.g., to a disk drive base plate) so as to fix the position of the second latch member relative to the housing. The latch pivot may be integrally formed with this second latch member, for instance to reduce manufacturing costs. In addition, the first and second latch members may both be formed from plastic or the like for noise/interference reduction purposes. In any case, the first and second latch members may each include a pair of cups, with one cup being disposed on each side of the latch pivot. That is and for this case, the first latch member may have a first cup and a latch for engaging the actuator arm assembly disposed on one side of the latch pivot, and a second cup disposed on the opposite side of the latch pivot. The second latch member similarly may have a third cup disposed on one side of the latch pivot and a fourth cup disposed on the opposite side of the latch pivot. One inertial mass is retained between the first cup of the first latch member and the third cup of the second latch member, while another inertial mass is retained between the second cup of the first latch member and the fourth cup of the second latch member. In the case where the movement of the latch of the first latch member is characterized as being at least generally upward to provide the desired latching function, the first cup of the movable first latch member engages an upper portion of a first inertial mass, while the third cup of the fixed second latch member engages a lower portion of this first inertial mass. Similarly, the second cup of the movable first latch member engages a lower portion of a second inertial mass, while the fourth cup of the fixed second latch member engages an upper portion of the second inertial mass. In the event that the shock event is within the noted "x-y" dimension (e.g., rotational, linear), both the first and second inertial masses will act on the first latch member to pivot the same about the latch pivot in a manner so as to move the latch into engagement with the actuator arm assembly. However, if the shock event is totally within the noted "z" dimension, only the second inertial mass will act on the first latch member to pivot the same about the latch pivot in a manner so as to move the latch into engagement with the actuator arm assembly. That is, in this second instance the first inertial mass will not contribute to activating the first latch member.

The above-noted third cup also may be shaped to increase the potential for the latch on the first latch member engaging the actuator arm assembly (e.g., for maintaining a desired alignment of the first latch member). One way of characterizing the third cup in this instance is that it may have somewhat of a trough-like shape, with the elongation being at least generally parallel with that portion of the first latch member that has the latch. Another characterization of the third cup in this instance in that the cavity defined by the first cup has a length dimension that is larger than a diameter of the first inertial mass, and a width dimension that is smaller than the length dimension. The third cup may also be characterized as having a planar base and an annular sidewall.

A second aspect of the present invention is a disk drive in accordance with the above-noted general disk drive configuration. In the case of the second aspect, the actuator arm assembly may be of a linear or a rotary type. In any case, the actuator arm latch assembly in the case of the second aspect includes a latch pivot and a first latch member that is mounted on the latch pivot. The first latch member in turn includes a latch for engagement with the actuator arm assembly to provide the desired latching function. In this regard, the first latch member moves about the latch pivot at least generally between non-latching and latching positions. When the first latch member moves about the latch pivot to its latching position, this latch is disposed further from a base plate of the disk drive housing than when the first latch member is disposed in its non-latching position. Although not required by the subject second aspect, each of the various features discussed above in relation to the first aspect may be utilized by this second aspect of the present invention as well and in any appropriate combination.

A third aspect of the present invention is a disk drive in accordance with the above-noted general disk drive configuration. In the case of the third aspect, the actuator arm assembly may be of a linear or a rotary type. In any case, the actuator arm latch assembly in the case of the third aspect includes a latch pivot and a first latch member that is mounted on the latch pivot. The first latch member in turn includes a latch for engagement with the actuator arm assembly to provide the desired latching function. The first latch member also includes at least one cup. An inertial mass is at least partially disposed within this cup and exerts a force on the cup to move the first latch member about the latch pivot to in turn move the latch into position to provide the desired latching function. Although not required by the subject third aspect, each of the various features discussed above in relation to the first aspect may be utilized by this third aspect of the present invention as well and in any appropriate combination.

A fourth aspect of the present invention is a disk drive in accordance with the above-noted general disk drive configuration. In the case of the fourth aspect, the actuator arm assembly may be of a linear or a rotary type. In any case, the actuator arm latch assembly in the case of the fourth aspect is of a configuration so as to provide a latching function both when the shock event is directed principally within or parallel to the noted "x-y" dimension, and when the shock event is directed principally within the noted "z" dimension. Although not required by the subject fourth aspect, each of the various features discussed above in relation to the first aspect may be utilized by this fourth aspect of the present invention as well and in any appropriate combination.

A fifth aspect of the present invention is a method for reducing the potential for undesired contact between a head and a data storage disk of a disk drive. The method includes the step of parking the head in a desired position relative to its corresponding data storage disk. A latching function of sorts is provided by the fifth aspect when the disk drive is in this non-operational mode. In this regard, the method of the fifth aspect includes exposing the disk drive to a first force after the head has been parked. At least a primary component of this first force is contained within a first reference plane. Undesired movement of the head (e.g., in a direction that is "across" the corresponding data storage disk) is restrained when the disk drive is exposed to this first force. The method of the fifth aspect also includes exposing the disk drive to a second force after the head has been parked, but at a different time than the noted first force. At least a primary component of this second force is totally contained within a second reference plane that is disposed at an angle to the above-noted first reference plane. Undesired movement of the head is also restrained when the disk drive is exposed to this second force.

Various refinements exist of the features noted in relation to the subject fifth aspect of the present invention. Further features may also be incorporated in the subject fifth aspect of the present invention as well. These refinements and additional features may exist individually or in any combination. Initially, the head may be parked so as to be disposed beyond a perimeter of the corresponding data storage disk. This is commonly referred to in the art as a disk drive of a dynamic load/unload type. The head may also be parked directly on its corresponding data storage disk. This is commonly referred to in the art as a disk drive of a contact start/stop type.

The restraint of the movement of the head relative to its corresponding data storage disk in accordance with the subject fifth aspect may be provided by an appropriate movement of a latch. This movement is subject to a number of characterizations. In one embodiment, this latch moves at least generally away from a base plate of the disk drive. In another embodiment, this latch moves at least generally within a plane that is disposed at an angle (e.g., perpendicular) relative to a data storage surface(s) of any data storage disk of the disk drive. In another embodiment, this latch pivots about an axis that is disposed in non-parallel relation to a rotational axis of a data storage disk(s) of the disk drive. In yet another embodiment, this latch moves within a reference plane that is in non-parallel relation (e.g., perpendicular) to a plane in which the head moves across its corresponding data storage disk during normal disk drive operations (e.g., during read and/or write operations).

In one embodiment of the fifth aspect, the first reference plane is parallel with a base plate of the disk drive or is "horizontally" disposed for normal disk drive operations, while the second reference plane is "vertically" disposed such that the second reference plane is perpendicular to the first reference plane. Both linear and/or rotational forces within the first and/or second reference planes may be exerted on the disk drive and initiate a "latching" function to attempt to restrain movement of the head within the plane in which the head moves during normal disk drive operations.

DETAILED DESCRIPTION

Figure 1:
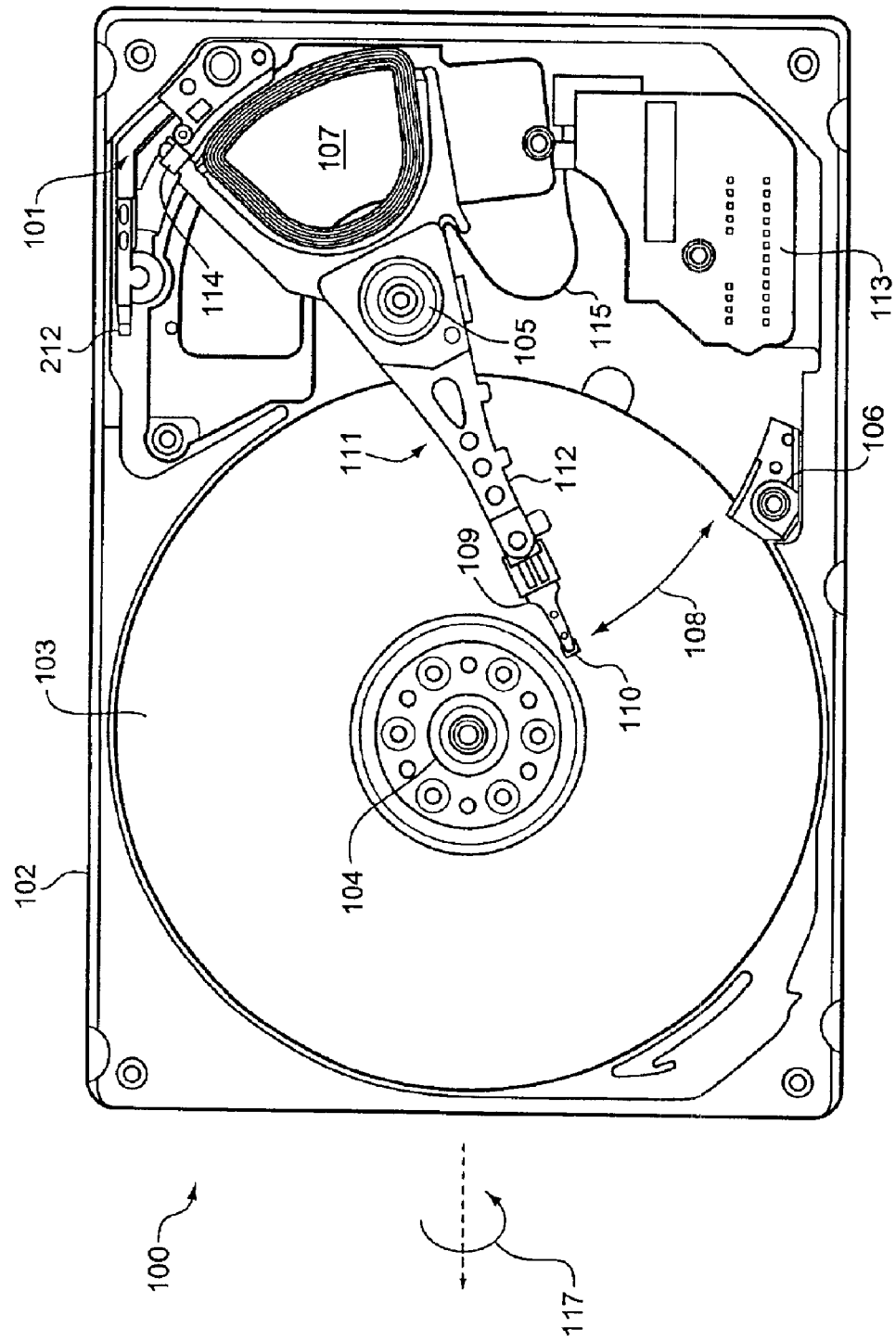
FIG. 1 is a top view of one embodiment of a disk drive with one embodiment of a multi-axes shock actuator arm latch assembly.

Reference will now be made to the accompanying drawings which at least assist in illustrating the various pertinent features of the present invention. FIG. 1 illustrates one embodiment of a disk drive 100 that includes a multi-axes shock actuator arm latch assembly 101. The disk drive 100 generally includes a base or base plate 102. A cover (not shown) is detachably interconnected with the base plate 102 to collectively define an at least substantially enclosed space for the various components of the drive 100. Both the base plate 102 and the cover may be considered as being part of a housing for the disk drive 100.

At least one data storage disk 103 of an appropriate computer-readable storage media is rotatably interconnected with the base plate 102 and/or cover via a spindle motor 104 or the like. Multiple data storage disks 103 would be in vertically spaced relation on the spindle motor 104 and simultaneously rotated by the spindle motor 104. An actuator arm assembly 111 is pivotally interconnected with the base plate 102 and/or cover via an actuator arm pivot 105. The actuator arm assembly 111 includes at least one rigid actuator arm 112. Multiple actuator arms 112 would be disposed in vertically spaced relation, with one actuator arm 112 typically being provided for each data storage surface of each data storage disk 103 of the disk drive 100. Movement of the actuator arm assembly 111 is provided by a voice coil motor 107 or the like, and which may then be considered as an actuator arm drive assembly. The voice coil motor 107 is a magnetic assembly that controls the operation of the actuator arm assembly 111 under the direction of control circuitry 113.

A load beam or suspension 109 is attached to each actuator arm 112 and is typically biased toward its corresponding data storage disk 103. Mounted on the free end of the suspension 109 is a head 110. The head 110 is part of a slider or slider body which includes at least one appropriate transducer. Signals are exchanged between the head 110 and its corresponding data storage disk 103 for disk drive read and/or write operations. In this regard, the voice coil motor 107 pivots the actuator arm assembly 111 to move each head 110 along an at least generally arcuate path 108 "across" the corresponding data storage disk 103 to position the head 110 at the desired/required radial position on the disk 103 (i.e., at the correct track on the data storage disk 103) for disk drive read/write operations.

When the disk drive 100 is not in operation, the actuator arm assembly 111 is pivoted to a "parked position" to dispose each head 110 beyond a perimeter of its corresponding data storage disk 103. This is commonly referred to in the art as being a dynamic load/unload disk drive configuration. In this regard, the disk drive 100 includes a ramp assembly 106 that is disposed beyond a perimeter of the data storage disk 103 to typically both move the corresponding head 110 vertically away from its corresponding data storage disk 103 and to also exert somewhat of a retaining force on the actuator arm assembly 111. Any configuration for the ramp assembly 106 that provides the desired "parking" function may be utilized.

The disk drive 100 again includes the multi-axes shock actuator arm latch assembly 101 that is mounted to the base plate 102 at least generally adjacent to the voice coil motor 107. When the actuator arm assembly 111 is rotated to its "parked position," the actuator arm latch assembly 101 is available to at least attempt to prevent non-operational shock forces that are exerted on the disk drive 100 from moving the actuator arm assembly 111 away from the ramp assembly 106 and across the data storage disk(s) 103. As will become apparent from the following description, the actuator arm latch assembly 101 pivots between non-latched and latched positions about an axis that is perpendicular to the axis about which the actuator arm assembly 111 pivots. Advantageously, this permits the actuator arm latch assembly 101 to protect the disk drive 100 from linear, rotational and combinations of linear and rotational forces that may be exerted on the disk drive 100, at least generally regardless of the direction or axes of the shock event. When the actuator arm latch assembly 101 pivots to the latched position responsive to a non-operational force, engagement of the actuator arm latch assembly 101 with a distal end 114 of the actuator arm assembly 111 will prevent further movement of the actuator arm assembly 111 away from the "parked position" on the ramp assembly 106. During the absence of a non-operational force on the disk drive 100, the actuator arm latch assembly 101 remains in the non-latched position where the actuator arm assembly 111 is thereby free to pivot under the control of the voice coil motor 107.

Those skilled in the art will appreciate that although the multi-axes shock actuator arm latch assembly 101 is being described herein in conjunction with the disk drive 100, such may be incorporated into any appropriate disk drive configuration. For instance, the multi-axes shock actuator arm latch assembly 101 could be used with a disk drive having a linear actuator arm drive assembly versus the rotational drive assembly described in relation to the disk drive 100. Moreover, the multi-axes shock actuator arm latch assembly could be used in contact start/stop disk drive configurations. These are but a few examples of applications for the multi-axes shock actuator arm latch assembly described herein.

Figure 2:
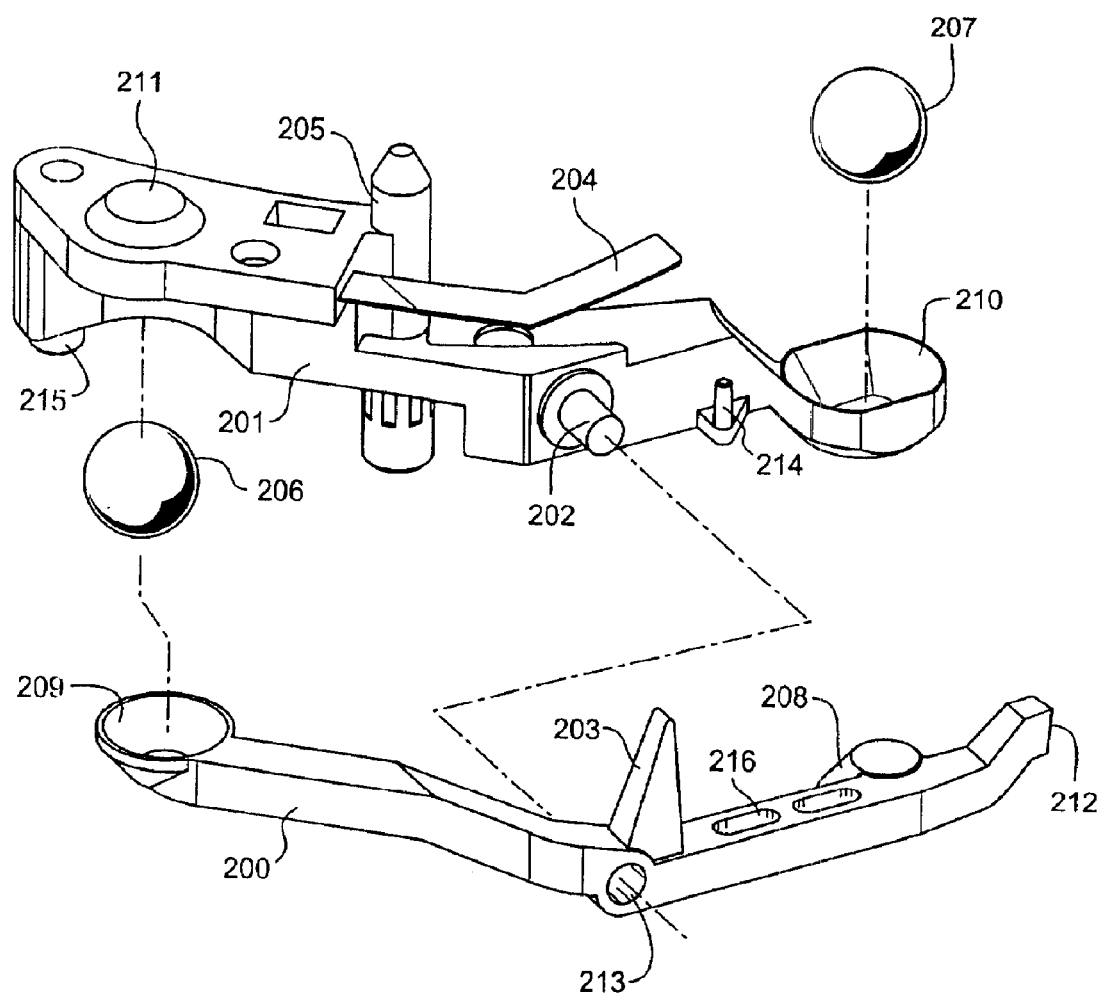
FIG. 2 is an exploded, perspective view of the actuator arm latch assembly of FIG. 1.
Figure 3:
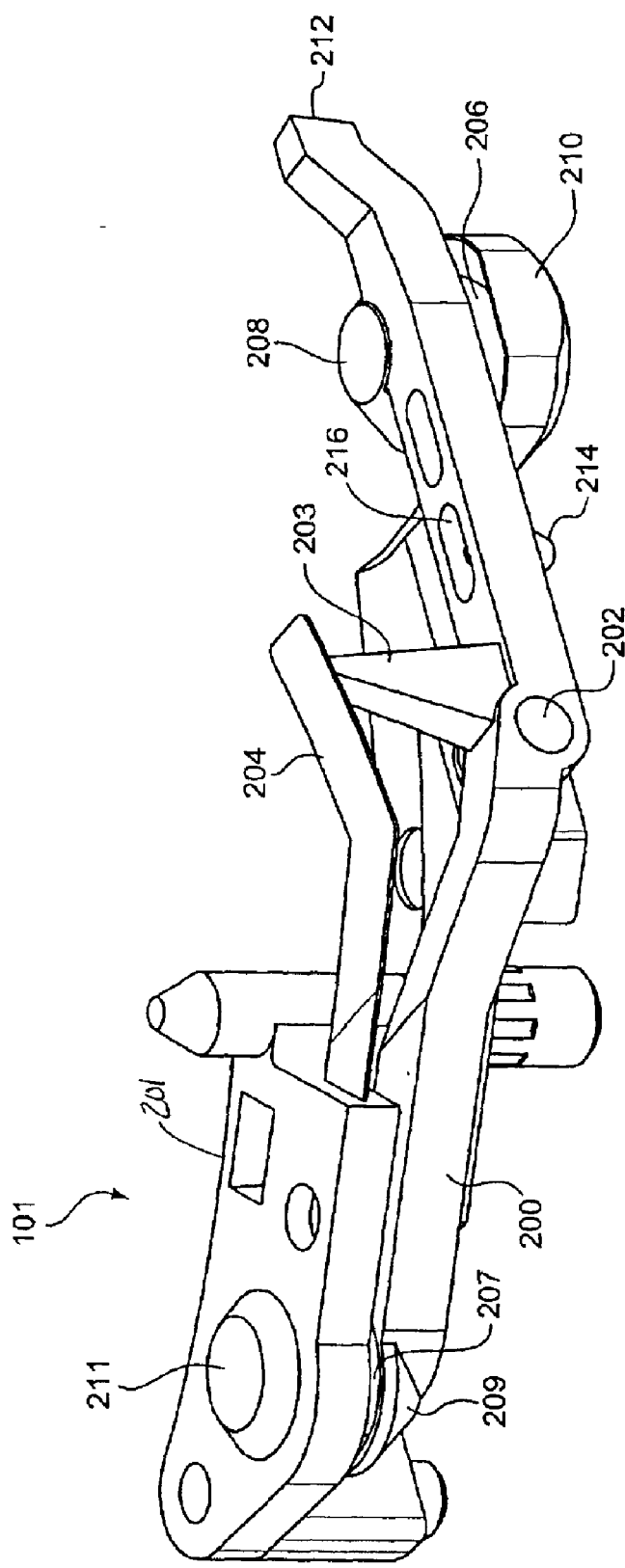
FIG. 3 is an assembled, perspective view of the actuator arm latch assembly of FIG. 1.

FIGS. 2–3 illustrate the actuator arm latch assembly 101 in more detail. The actuator arm latch assembly 101 includes a fixed latch member 201 and a pivotal latch member 200, a pair of inertial masses, 206 and 207, and a bias member 204. The pivotal latch member 200 pivotally interconnects with the fixed latch member 201 at a latch pivot 202 on the fixed latch member 201. The fixed latch member 201, on the other hand, mounts to the base plate 102 of the disk drive 100 at least generally adjacent the voice coil motor 107. The latch member 201 is fixed to the base plate 102 and does not move relative to the base plate 102. It will be appreciated that the components of the actuator arm latch assembly 101, including the inertial masses, 206 and 207, are preferably non-magnetic in nature due to their close proximity to the magnetic components of the voice coil motor 107. In one embodiment, the latch members, 200 and 201, are formed from a plastic material such as Teflon®-filled polycarbonate, which also reduces noise/interference, reduces wear, and allows for an integral construction for each of the latch members 200 and 201, while the inertial masses, 206 and 207, may be formed from materials such as UNS_S31600 or zirconia. Notwithstanding this recitation of materials, the materials from which the actuator arm latch assembly 101 are formed is not critical to the actual latching operation.

The fixed latch member 201 is an elongated structure that includes the latch pivot 202 on which the pivotal latch member 200 is pivotally mounted. Generally, the latch pivot 202 is disposed in non-parallel relation to the rotational axis of the data storage disk 103 (i.e., the spindle motor 104), the pivot axis of the actuator arm assembly 111 (i.e., the actuator arm pivot 105; the axis 504 discussed below in relation to FIGS. 5–6A), and the general plane in which the base plate 102 is disposed. In the illustrated embodiment, the latch pivot 202 is disposed at least generally perpendicular to the rotational axis of the data storage disk 103, the pivot axis of the actuator arm assembly 111, and the general plane in which the base plate 102 is disposed. More accurately, the axis along which the latch pivot 202 extends is disposed within a reference plane that is non-parallel to both a reference plane that contains the rotational axis of the data storage disk 103, a reference plane that contains the pivot axis of the actuator arm assembly 111, and the general plane in which the base plate 102 is disposed.

The fixed latch member 201 also includes a pair of cups 210, 211 that are open in at least generally opposing directions relative to one another. Specifically, the cup 210 is disposed at least generally at one end of the fixed latch member 201 and is open in a first direction for the partial receipt of the inertial mass 207. The cup 211 is at least generally disposed at the opposite end of the fixed latch member 201 and is open in a one hundred and eighty degree orientation relative to the cup 210 for the partial receipt of the inertial mass 206. Regarding the position of the cups 210, 211 on the fixed latch member 201, what is required is that the cups 210, 211 be disposed on opposite sides of the latch pivot 202 on which the pivot latch member 200 is mounted. In any case, the cup 211 thereby projects or opens toward or in the direction of the base plate 102, while the cup 210 projects or opens at least generally away from the base plate 102 (and thereby in the direction of or toward the cover (not shown)).

The fixed latch member 201 also includes a bias member 204. The bias member 204 is disposed on a top portion of the fixed latch member 201 and extends at least generally horizontally for engagement with the pivotal latch member 200 to bias the same toward its non-latching position in a manner that will be discussed in more detail below. In one embodiment, the bias member 204 is a spring-like metal piece that is insert molded into the body of the fixed latch member 201. Other types/structures for generating the desired biasing forces and other ways of incorporating the same in the fixed latch member 201 may be utilized.

The fixed latch member 201 also includes a guidepost 214 that mates with the underside of an aperture 216 in the pivotal latch member 200 when the pivotal latch member 200 is mounted on the latch pivot 202. The guide post 214 remains within the aperture 216 when the pivotal latch member 200 pivots about the latch pivot 202 between the non-latched and latched positions. Functionally, the guide post 214 operates to at least generally guide the pivotal latch member 200 in the vertical direction.

A mounting post 205 is also formed at least generally in a mid portion of the fixed latch member 200. The mounting post 205 provides for mounting the fixed latch member 200 to the base plate 102 of the disk drive 100. In one embodiment, the mounting post 205 is fastened to the base plate 102 using a fastener and operates in conjunction with a support feature 215 that is also part of the fixed latch member 201. The support feature 215 mates with a corresponding feature formed in the base plate 102 to prevent rotation of the fixed latch member 201 within the noted "x-y" dimension. Any appropriate way of fixing the latch member 201 to the base plate 102 may be utilized.

It should be appreciated that the above-described structure for the fixed latch member 201 may be readily formed as an integral structure, for instance by injection molding techniques or the like. However, any construction may be used for the fixed latch member 201, including forming everything but the biasing member 204 from a common material as noted above.

The pivotal latch member 200 is also an elongated structure that includes a latch pivot aperture 213 to allow the pivotal latch member 200 to be mounted on the latch pivot 202 of the fixed latch member 201. The pivotal latch member 200 also includes an elongated slot or aperture 216 which receives the guide post 214 on the fixed latch member 201 as noted. Generally, the guide post 214 of the fixed latch member 201 remains within the elongated aperture 216 of the pivotal latch member 200 during the pivoting of the pivotal latch member 201 between its non-latching and latching positions to help maintain proper alignment of the pivotal latch member 200.

The pivotal latch member 200 also includes a pair of cups 208 and 209 that are disposed on opposite sides of the latch pivot aperture 213 and thereby on opposite sides of the latch pivot 202. The cups 208, 209 are open in at least generally in opposing directions relative to one another. Specifically, the cup 208 is disposed at least generally at one end of the pivotal latch member 200 and is open in a direction that mates with the cup 210 of the fixed latch member 201 to form a housing for receipt of the inertial mass 207 when the pivotal latch member 200 is mounted on the fixed latch member 201. The cup 209 is disposed at least generally at the other end of the pivotal latch member 200 and is open in a one hundred and eighty degree orientation relative to the cup 208, and mates with the cup 211 of the fixed latch member 201 to form another housing for receipt of the inertial mass 206 when the pivotal latch member. 200 is mounted on the fixed latch member 201. Further regarding the position of the cups 208, 209 on the pivotal latch member 200, what is required is that the cups 208, 209 be disposed on opposite sides of the latch pivot 202 on which the pivot latch member 200 is mounted and in at least general vertical alignment with the cups 210, 211, respectively associated with the fixed latch member 201. As such, the cup 208 thereby projects or opens toward or in the direction of the base plate 102, while the cup 209 projects or opens at least generally away from the base plate 102 (and thereby in the direction of or toward the cover (not shown)).

The pivotal latch member 200 also includes a latch stop or latch 212 that is formed distal to the cup 209, or on the side of the pivotal latch member 200 that includes the cup 208. The latch 212 is pivotable between the non-latched position and the latched position by the latch member 200 responsive to a non-operational force being exerted on the disk drive 100. When the latch 212 is pivoted to the latched position, the latch 212 engages the distal end 114 of the actuator arm 112 to substantially prevent further pivoting of the actuator arm assembly 111. That is, the latch 212 is disposed within the path through which the actuator arm assembly 111 travels during normal disk drive read/write operations while the actuator arm latch assembly 101 is activated or in its latching position. When the latch 212 is in the non-latched position, the latch 212 remains "out-of-the-way" of the actuator arm assembly 111 to permit normal operation of the disk drive 100. That is, when the actuator arm latch assembly 101 is inactive or in its non-latching position, the latch 212 is not disposed in the path in which the actuator arm assembly 111 moves during normal operation of the disk drive 100. The latch stop 212 may be of any appropriate configuration and in any appropriate orientation to provide the desired latching function. In the embodiment of FIGS. 2–3, the latch stop 212 is a planar surface that is disposed within/parallel with the z dimension or disposed so as to be perpendicular to the x-y plane. However, it may be desirable to orient/configure the engaging surface of the latch stop 212, the surface of the actuator arm assembly 111 that is engaged by the latch stop 212, or both, so that any engagement of the latch stop 212 with the actuator arm assembly 111 will tend to open or activate the actuator arm latch assembly 101 (i.e., to move/bias the same to its latching position). In one embodiment and as will be discussed in more detail below, the latch stop 212 may be a planar surface that is disposed at an angle other than 90 degrees relative to the x-y plane to provide this function.

The pivotal latch member 200 also includes a fulcrum 203. The bias member 204 of the fixed latch member 201 extends at least generally horizontally so that the bias member 204 engages the fulcrum 203 on the pivotal latch member 200. When the pivotal latch member 200 is mounted on the latch pivot 202, the fulcrum 203 provides a point of contact for the bias member 204. Generally, the bias member 204 biases the pivotal latch member 200 toward its non-latching position. Although the bias member 204 is shown as being in constant contact with the fulcrum 203, even in the non-latched position, such need not be the case. Moreover, any appropriate way for biasing the pivotal latch member 200 toward its non-latching position, or stated another way for moving the pivotal latch member 200 out of the latching position, may be utilized.

Figure 5:
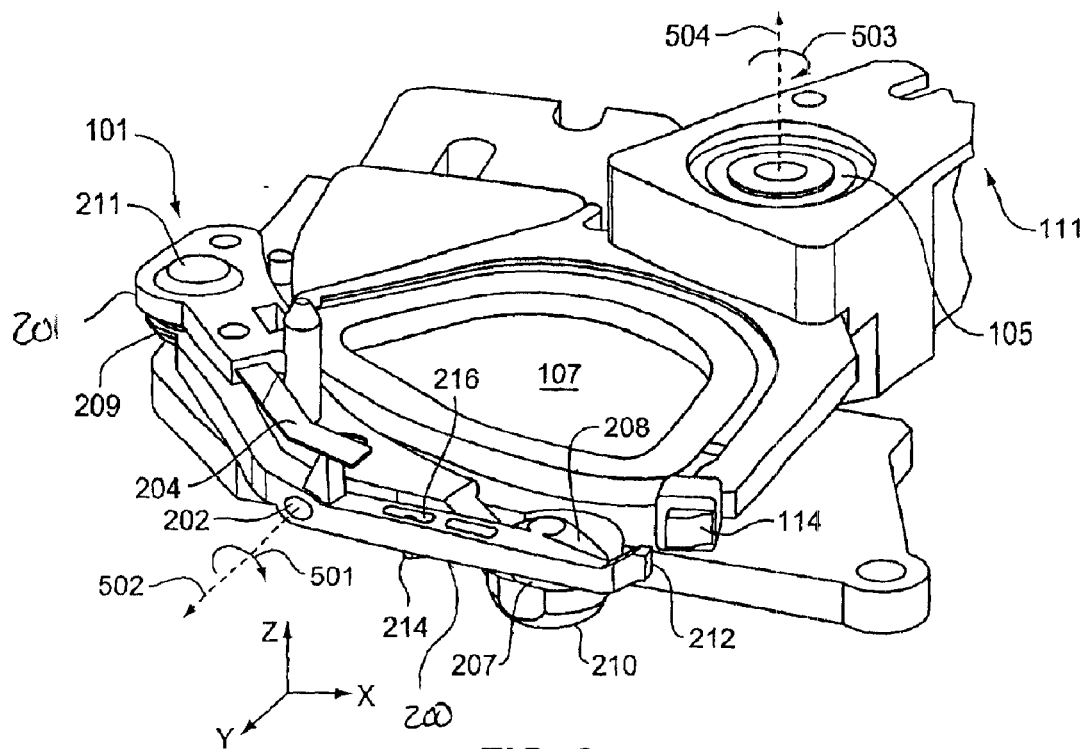
FIG. 5 is an enlarged, perspective view of the actuator arm latch assembly and the actuator arm assembly of FIG. 1, with the actuator arm latch assembly being in its non-latching position.
Figure 8:
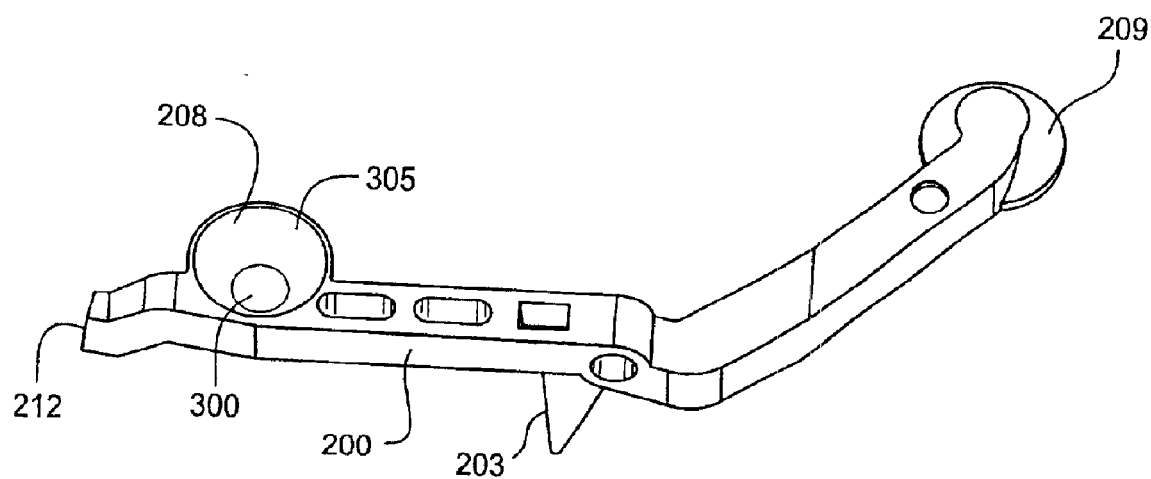
FIG. 8 is a perspective view a pivotal latch member of the actuator arm assembly of FIG. 1.
Figure 9:
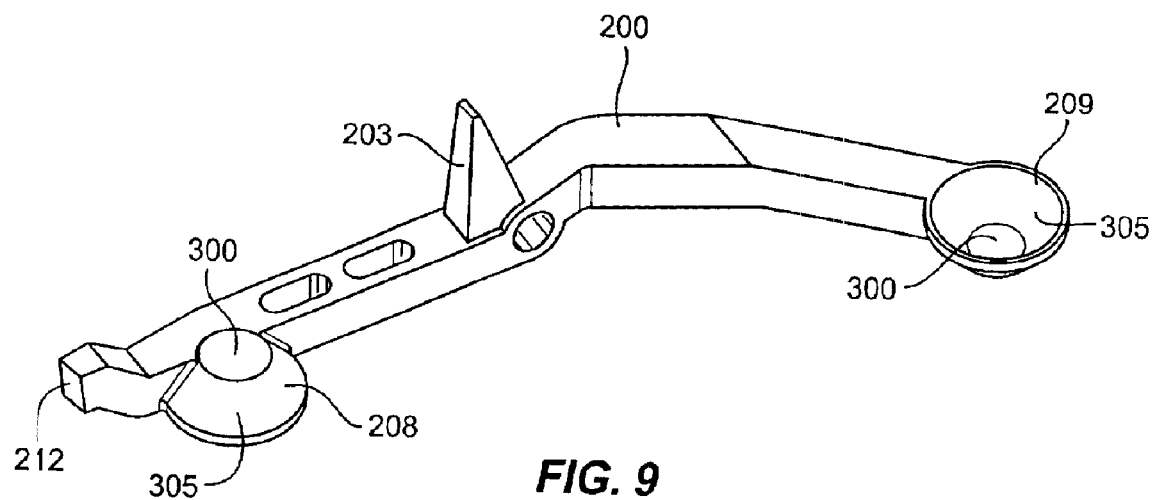
FIG. 9 is another perspective view of the pivotal latch member of the actuator arm assembly of FIG. 1.
Figure 10:
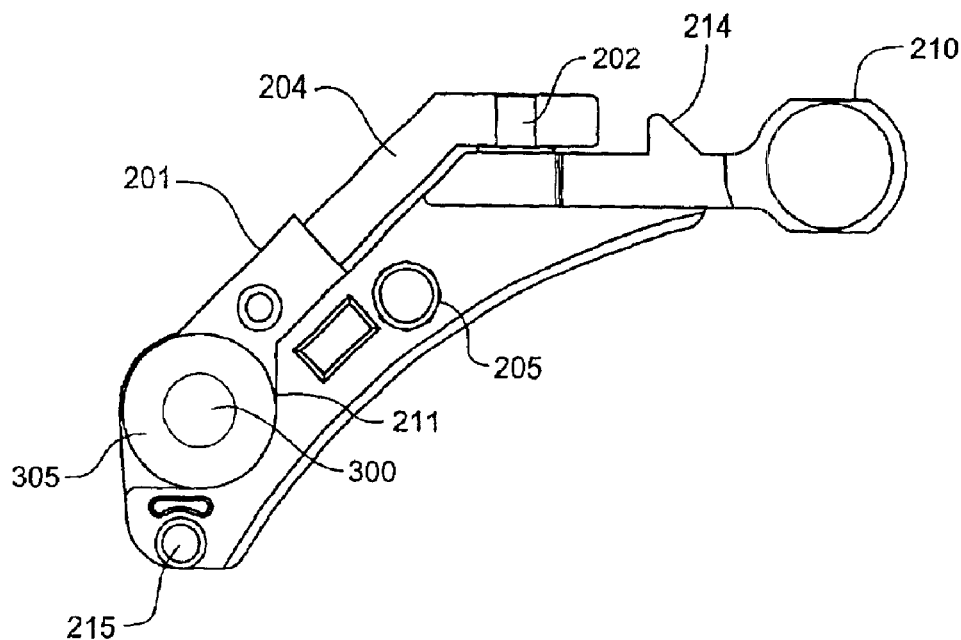
FIG. 10 is a top plan view a fixed latch member of the actuator arm latch assembly of FIG. 1.

FIG. 3 illustrates an assembled view of the actuator arm latch assembly 101 and in the non-latched position. Operationally, the pivotal latch member 200 is designed to pivot about the latch pivot 202 in response to non-operational forces being exerted on the disk drive 100 from at least most angles, direction, or axes of rotation. Forces that will tend to open or activate the actuator arm latch assembly 101 may be exerted on the base 300, the sidewall 305 (FIGS. 8–9), or both of one or more of the cups 208, 209 that are associated with the pivotal latch member 200, including without limitation forces that are due to a tangential acceleration, a radial acceleration, or both of one or more of the inertial masses 206, 207. For example, the pivotal latch member 200 will pivot about the latch pivot 202 responsive to linear forces that are within or at least have a primary component in the noted "X-Y" dimension or plane (i.e., that which contains the X axis and Y axis that are depicted in FIG. 5), or that are within or at least have a primary component in the noted "Z" dimension (i.e., any reference plane that contain the Z axis illustrated in FIG. 5). The pivotal latch member 200 will also operate to pivot about the latch pivot 202 responsive to rotational forces received about most vertical axes of rotation, a horizontal axis of rotation or combination of vertical and horizontal axis of rotation. About the only shock axis where the operation of the latch assembly 101 may be adversely impacted to an undesired degree is a rotational force that is about the latch pivot 202. In any case, when the latch member 200 pivots about the latch pivot 202, the latch 212 is moved vertically upward relative to the base plate 102 of the disk drive 100 to engage the distal end 114 of the actuator arm assembly 111, and thereby prevent further pivoting of the actuator arm assembly 111 in a direction tending to advance the head 110 across its corresponding data storage disk 103. During this pivotal movement, the guide post 214 on the fixed latch member 201 again remains in the aperture 216 on the pivotal latch member 200 to help maintain vertical alignment of the pivotal latch member 200 relative to the fixed latch member 201 so that direct contact is made between the latch 212 and the distal end 114 of the actuator arm assembly 111.

The latch operation occurs in response to acceleration of the inertial mass 206 within the mating cups 208 and 210 and/or acceleration of the inertial mass 207 in the mating cups 209 and 211. As the inertial mass 207 and/or the inertial mass 206 is excited, they translate in various directions within their respective cups to create a moment on the pivotal latch member 200 about the latch pivot 202. If the moment generated on the latch member 200 is greater than an opposing moment generated by the bias member 204 and fulcrum 203, the pivotal latch member 200 pivots about the latch pivot 202 at least toward the desired latching position. If the moment generated on the latch member 200 by the inertial masses 206 and/or 207 is less than the opposing moment generated by the bias member 204 and fulcrum 203, the pivotal latch member 200 remains in a non-latching position in relation to the actuator arm assembly 111. As will become apparent from the following description, the actuator arm latch assembly 101 is tunable to control the amount of non-operational force on the disk drive 100 that is required to actuate the actuator arm latch assembly 101. Advantageously, this limits operation of the actuator arm latch assembly 101 to forces that are severe enough to have an adverse effect on the disk drive 100 by moving the actuator arm assembly 111 away from the "parked position" on the ramp assembly 106.

Figure 4:
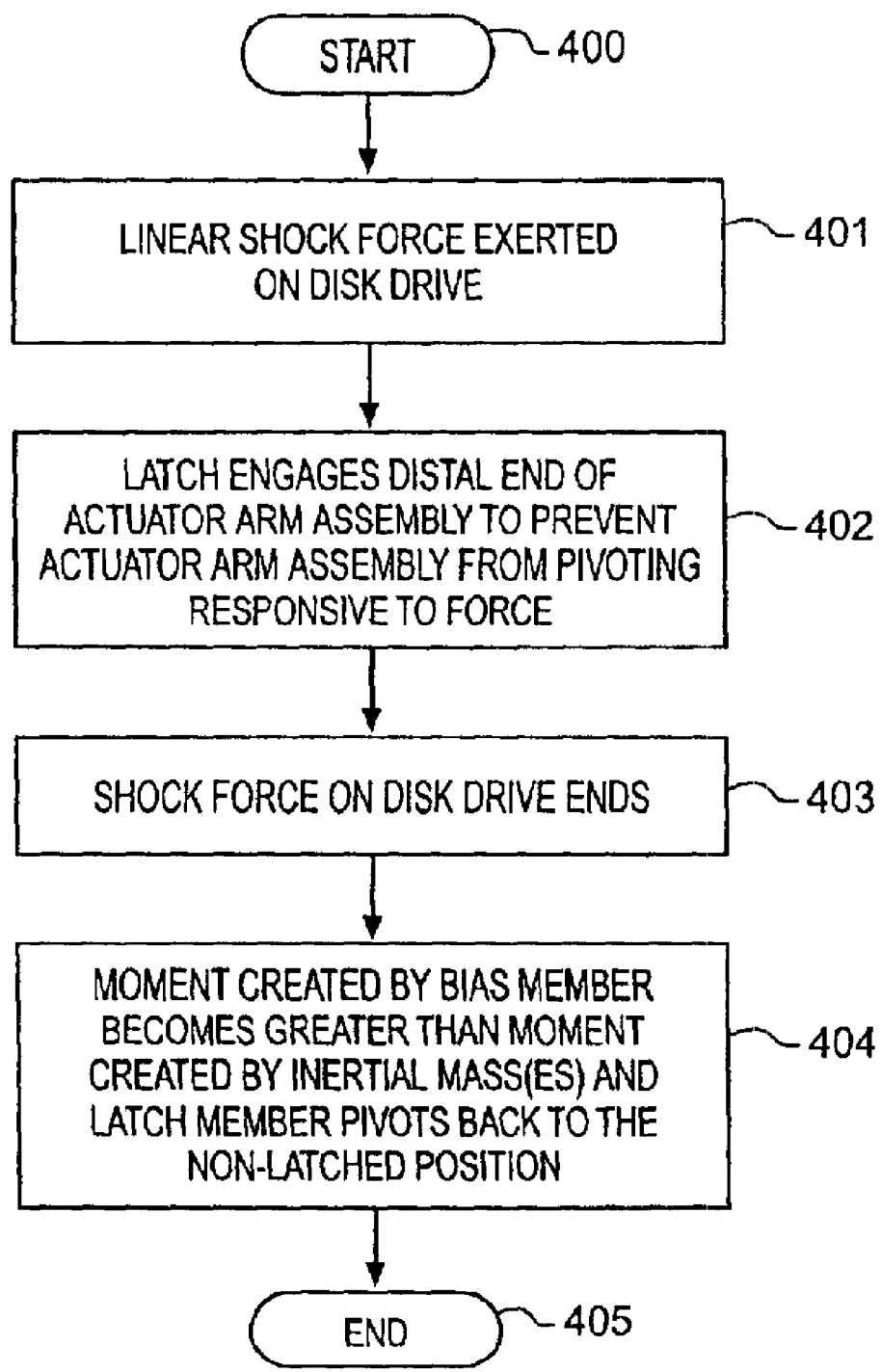
FIG. 4 is a flowchart illustrating one embodiment of a latching operation for the actuator arm latch assembly of FIG. 1.
Figure 6A:
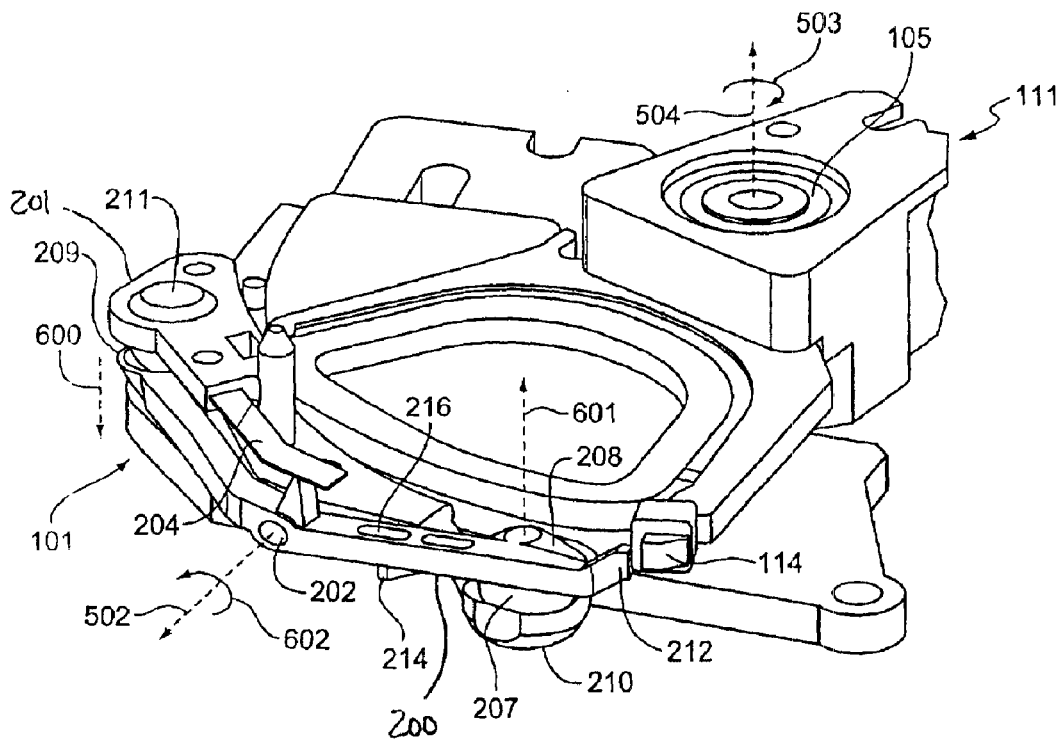
FIG. 6A is an enlarged, perspective view of the actuator arm latch assembly and the actuator arm assembly of FIG. 1, with the actuator arm latch assembly being in its latching position.

FIG. 4 is a flow chart illustrating an example of the operational steps of the actuator arm latch assembly 101 when a linear force is applied to the disk drive 100. The operational steps of FIG. 4 are described in conjunction with the various views of the actuator arm latch assembly 101 shown in FIGS. 1–3 and 5–6A. FIG. 5 illustrates the non-latched position of the actuator arm latch assembly 101 relative to the distal end 114 of the actuator arm assembly 111, whereas FIG. 6A illustrates the latched position of the actuator arm latch assembly 101 relative to the distal end 114 of the actuator assembly 111. As illustrated by FIG. 5, when the actuator arm latch assembly 101 is in then on-latched position, the actuator arm assembly 111 is free to pivot about its pivot axis 504 (that corresponds with the pivot 105) to transition the head 110 "across" its corresponding data storage disk 103 for disk drive read/write operations. FIG. 6A, on the other hand, illustrates the latched position of the actuator arm latch assembly 101 relative to the distal end 114 of the actuator arm assembly 111. In the latched position of FIG. 6A, the distal end 114 of the actuator arm assembly 111 is engaged by the latch 212 to prevent further movement of the actuator arm assembly 111 about the axis 504 in a direction which would transition the head 110 across its corresponding data storage disk 103.

Figure 6B:
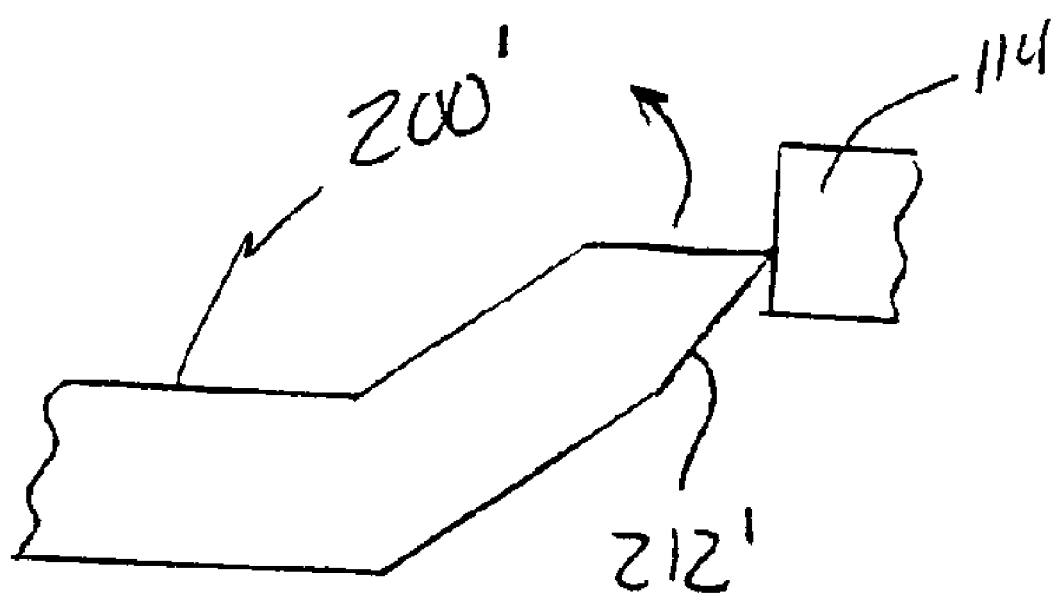
FIG. 6B is an alternative embodiment for a latch stop that may be utilized by the actuator arm latch assembly of FIG. 1 to bias the actuator arm latch assembly to its open or "latching" position.

As noted above, in one embodiment the latch stop 212 and/or the distal end 114 of the actuator arm assembly 111 may be oriented/configured to bias the latch assembly 101 toward its open or latching position upon engagement of the latch stop 212 with the actuator arm assembly 111. FIG. 6B illustrates one way In which this may be done. Here, the pivotal latch member 200' includes a latch stop 212' that is disposed at an angle other than 90 degrees relative to the x-y plane, such that engagement of the latch step 212' with the distal end 114 of the actuator arm assembly 111 biases the pivotal latch member 200 in the direction of the arrow presented in FIG. 6B (toward the open/latching position).

On FIG. 4 the operation begins at step 400. At step 400, the actuator arm assembly 111 is in the "parked position" on the ramp assembly 106. When the actuator arm assembly 111 is in the "parked position," the actuator arm latch assembly 101 is in the position of FIG. 5 relative to the distal end 114 of the actuator arm assembly 111 absent a non-operational force on the disk drive 100. In this position, the bias member 204 creates a continuous moment about the latch pivot 202 in the direction 501 that retains the pivotal latch member 200 in the non-latched position as Illustrated in FIG. 5. In the non-latched position, the latch 212 is disposed below the distal end 114 of the actuator arm assembly 111 in an "out-of-the-way" position so that the actuator arm assembly 111 is free to pivot about the axis 504 to deliver the head 110 along the path 108 (FIG. 1).

At step 401 in FIG. 4, a linear shock force is exerted on the disk drive 100. If the linear shock force is received within or at least has a primary component in a reference plane defined by the X-axis and Y-axis, or within the noted "x-y" dimension (FIG. 5), this force causes the inertial masses, 206 and 207, to move within their respective cups. Specifically, the inertial mass 207 moves within the cups 208 and 210, and the inertial mass 206 moves within the cups, 209 and 211. As the inertial mass 207 accelerates within the cup 210 of the fixed latch member 201, which is fixed to the base plate 102, the inertial mass 207 moves up a sidewall of the cup 210 of the fixed latch member 201 and exerts an upwardly directed force on the cup 208 of the pivotal latch member 200. This creates a moment in the direction 602 about the axis 502 and latch pivot 202, as illustrated in FIG. 6A. Substantially simultaneously, the inertial mass 206 moves down a sidewall of the cup 211 of the fixed latch member 201 and exerts a downwardly directed force on the cup 209 of the pivotal latch member 200, increasing the moment in the direction 602 about the axis 502. As the moment created by the inertial masses 206 and 207 in the direction 602 (FIG. 6A) becomes greater than the opposing moment in the direction 501 created by the bias member 204 (FIG. 5), the pivotal latch member 200 pivots about the axis 502 in the direction 602 to move the latch 212 adjacent the distal end 114 of the actuator arm assembly 111.

If, on the other hand, the linear force is received substantially within or at least has a primary component in a reference plane that contains the Z-axis or the noted "Z" dimension, only the inertial mass 206 contributes to the activation of the actuator arm latch assembly 101. That is, the inertial mass 207 cannot move in a downward direction because its lower portion is engaged by the upwardly projecting cup 210 of the fixed latch member 201, which cannot move relative to the base plate 102 of the disk drive 100. However, since the lower portion of the inertial mass 206 is engaged by the cup 209 of the pivotal latch member 200, the inertial mass 206 is able to accelerate in the direction 600 within the cup 209 (FIG. 6A), creating the moment in the direction 602 about the axis 502 and latch pivot 202. As the moment created by the inertial mass 206 becomes greater than the opposing moment in the direction 501 created by the bias member 204 (FIG. 5), the latch member 200 pivots about the axis 502 in the direction 602 to move the latch 212 adjacent the distal end 114 of the actuator arm assembly 111.

Regardless of the direction of a linear force exerted on the disk drive 100, the latch assembly 101 should be activated so that its latch 212 moves toward the latching position to engage the distal end 114 of the actuator arm assembly 111, as indicated by step 402 in FIG. 4. This prevents the actuator arm assembly 111 from pivoting about the axis 504 in the direction 503 responsive to the force by an amount which would transition the head 110 across its corresponding data storage disk 103, or to otherwise retain the head 110 in the "parked position."

At step 403 in FIG. 4, the non-operational force on the disk drive 100 ends. Responsive to the end of the force, the inertial masses, 206 and 207, or the inertial mass 206, decelerates within their respective cups, thereby decreasing the moment in the direction 602 about the axis 502 (FIG. 6A). At step 404, the moment created by the bias member 204 becomes greater than the moment created by the inertial mass(es) 206 and/or 207, and the latch member 200 pivots in the direction 501 (FIG. 5) back to the non-latched position as the cup 209 closes relative to the cup 211 and the cup 208 closes relative to the cup 210. It will be appreciated by those skilled in the art that the operation is substantially identical when a linear force is received on the disk drive 100 from other directions and that at least one and/or both inertial masses 206 and 207 operate to pivot the pivotal latch member 200 to the latched position of FIG. 6A. At step 405 in FIG. 4, the operation ends.

Figure 7:
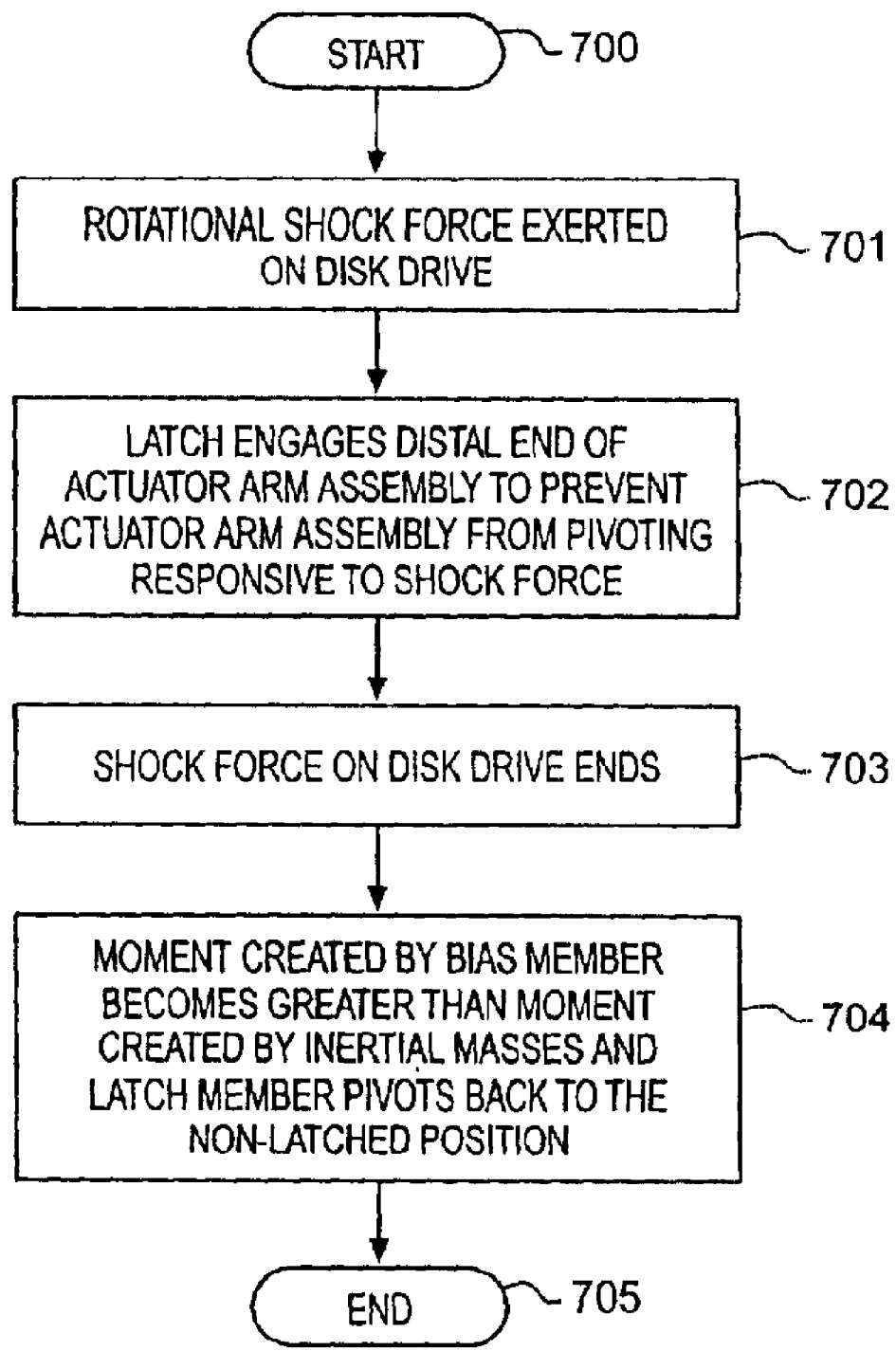
FIG. 7 is a flowchart illustrating another embodiment of a latching operation for the actuator arm latch assembly of FIG. 1.

FIG. 7 Is a flowchart illustrating an example of the operation of the actuator arm latch assembly 101 when a rotational force is exerted on the disk drive 100. In FIG. 7, the operation begins at step 700. At step 700, the actuator arm assembly 111 is in the "parked position" on the ramp assembly 106 and the actuator arm latch assembly 101 is in the position of FIG. 5 relative to the distal end 114 of the actuator arm assembly 111. As with the above example, in this position the bias member 204 creates a continuous moment in the direction 501 that retains the pivotal latch member 200 in the non-latched position, absent a force on the disk drive 100 (FIG. 5).

At step 701, a rotational force, such as force 117 depicted in FIG. 1, is exerted on the disk drive 100. The rotational force 117 causes the inertial mass 206 to accelerate in the direction 600 and the inertial mass 207 to accelerate in the direction 601 relative to the pivotal latch member 200, as illustrated in FIG. 6A. There would also be a radial acceleration of the inertial masses 206, 207 in a direction that would tend to open or activate the latch assembly 101 . The tangential and radial acceleration of the inertial masses 206 and 207 creates the moment in the direction 602 about the axis 502 and latch pivot 202 (FIG. 6A) that is greater than the opposing moment in the direction 501 created by the bias member 204 (FIG. 5). The moment in the direction 602 pivots the latch member 200 about the axis 502 in the direction 602 to move the latch 212 adjacent the distal end 114 of the actuator arm assembly 111. At step 702, the latch 212 engages the distal end 114 of the actuator arm assembly 111 to prevent the actuator arm assembly 111 from further pivoting about the axis 504 in the direction 503 responsive to the rotational force 117 by an amount which would transition the head 110 across its corresponding data storage disk 103, or to otherwise retain the actuator arm assembly 111 in its "parked" position, thereby retaining the head 110 in the "parked position" on the ramp assembly 106.

At step 703 in FIG. 7, the rotational force 117 on the disk drive 100 ends. Responsive to the end of the force 117, the inertial mass 206 decelerates within the cup 209 and the inertial mass 207 decelerates within the cup 208, decreasing the moment in the direction 602 about the axis 502. At step 704, the moment created by the bias member 204 becomes greater than the moment created by the inertial masses 206 and 207, and the latch member 200 pivots in the direction 501 back to the non-latched position (FIG. 5). The cup 209 closes relative to the cup 211 and the cup 208 closes relative to the cup 210. It will be appreciated by those skilled in the art that the operation is substantially identical when rotational forces are received on the disk drive 100 from directions other than the direction of the force 117. At step 705, the operation ends.

The shape or geometry of one or more of the cups 208, 209, 210, and 211 may be adjusted to affect the latching characteristics of the actuator arm assembly 101 in a desired manner. With reference to FIGS. 8–11, the cups, 208 and 209 of the pivotal latch member 200 and the cup 211 of the fixed latch member 201 may be at least generally frustumly-shaped (i.e., in the form of a truncated cone configuration) to facilitate movement of the inertial masses 206 and 207 in both the horizontal and vertical directions. In this case, the cups 208, 209, and 211 may be characterized as having a base 300 that engages the upper or lower extreme of the corresponding inertial mass 206, 207, and of an appropriate configuration (e.g., flat, spherical), and an annular sidewall 305 of any appropriate configuration (e.g., conical, spherical). However, the base 300 and/or sidewall 305 of the cups 208, 209, and 211 may be of any appropriate shape for realizing the desired response for the actuator arm latch assembly 101.

Figure 11:
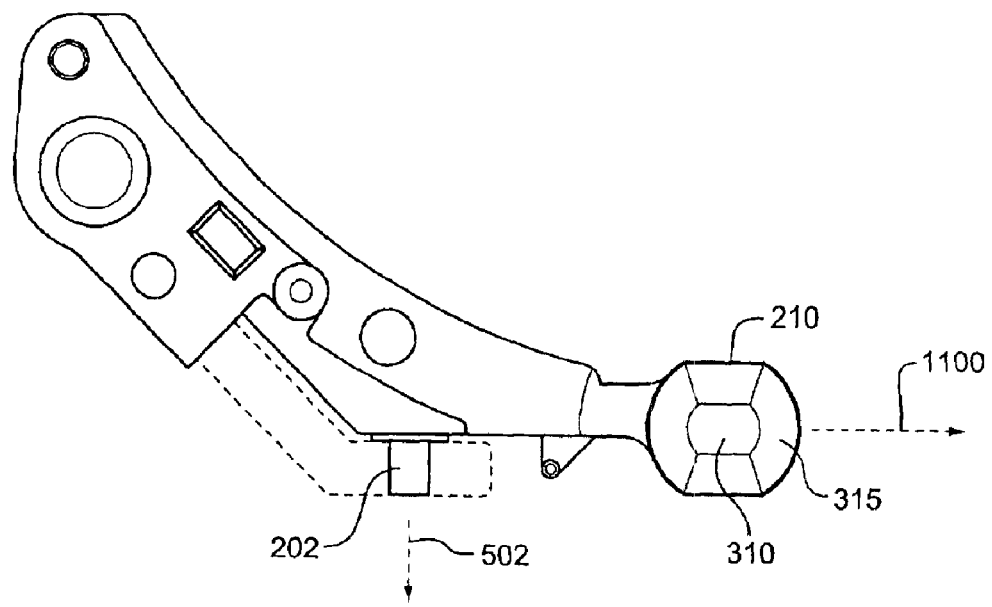
FIG. 11 is a bottom plan view of the fixed latch member of the actuator arm latch assembly of FIG. 1, with a biasing member being shown in dashed lines for viewing of a latch pivot on which the pivotal latch is mounted.

The cup 210 of the fixed latch member 210 is of a different configuration than the cups 208, 209, and 211 in the embodiment of FIGS. 2–3. The cup 210 includes a base 310 that engages the lower portion of the inertial mass 207 and an annular sidewall 315. All portions of any given annular portion of the sidewall 315 are not disposed the same distance from a reference axis about which the sidewall 315 is disposed. That is, the cup 210 is in the form of an elongated slot or of a trough-like configuration as best illustrated in FIG. 11. The cup 210 is at least slightly elongated along an axis 1100 that is perpendicular to the axis of rotation 502 of the pivotal latch member 200 and that is at least generally parallel with that portion of the pivotal latch member 200 that has the latch 212. The elongation of the cup 210 along the axis 1100 produces a rapid acceleration of the inertial mass 207 and assists in maintaining a precise vertical alignment of the pivotal latch member 200 with the distal end 114 of the actuator arm assembly 111. The elongation of the cup 210 along the axis 1100 permits the inertial mass 206 to accelerate predominantly along the axis 1100 within the cup 210. In particular, the alignment maintained by the elongation along the axis 1100 increases the potential that the latch 212 will engage the distal end 114 of the actuator arm assembly 111 when the pivotal latch member 200 is pivoted to the latched position.

Still referring to FIGS. 8–11, the response characteristics of the actuator arm latch assembly 101 are tunable to individual actuator arm designs to achieve desired responses of the pivotal latch member 200 relative to varying degrees of non-operational forces exerted on the disk drive 100. For instance, increasing and/or decreasing the effective slope of the sidewall 305/315 of the cups 208–211 may affect the acceleration of the inertial masses 206 and 207 within the cups 208–211. If the effective slope of the sidewall 305/315 of the cups 208–211 is increased, the inertial masses 206 and 207 accelerate slower within the cups 208–211, thereby increasing the amount of force required to activate the pivotal latch member 200. Similarly, decreasing the effective slope of the sidewall 305/315 of the cups 208–211 increases the acceleration of the inertial masses, 206 and 207, thereby decreasing the amount of force required to actuate the pivotal latch member 200. Those skilled in the art will appreciate that various effective sidewall slopes could be incorporated into the design of the cups 208–211 to achieve specific response characteristics of the inertial masses, 206 and 207. In one embodiment of the actuator latch assembly 101, the effective slope of the sidewall of the cups 208, 209, and 211 is in the range of about 40 to about 60 and more specifically is about 50, while the effective slope of the sidewall of the cup 210 is in the range of about 40 to about 60 and more specifically is about 50.

Another component of the actuator latch assembly 101 that may be used to "tune" the response of the pivotal latch member 200 is the fulcrum 203. The fulcrum 203 could be positioned at various locations on the pivotal latch member 200 to change the sensitivity of the pivotal latch member 200 relative to the amount of force exerted on the disk drive 100. For instance, moving the fulcrum 203 along the pivotal latch member 200 toward the pivot 202 decreases the required force on the disk drive 100 to actuate the actuator arm latch assembly 101. Similarly, moving the fulcrum 203 away from the pivot 202 will increase the required force on the disk drive 100 to actuate the actuator arm latch assembly 101. Those skilled in the art will appreciate that the above-described tuning characteristics could also be combined with other characteristics of the actuator arm latch assembly 101 to achieve numerous responses characteristics. For example, changing the density of the inertial masses, 206 and 207, the rigidity of the bias member 204, the location of the cups 208–211 along the latch members 200 and 201, or the length of the latch members 200 and 201, all could be used or combined with the above described techniques to tune the actuator latch assembly 101.

Figure 12:
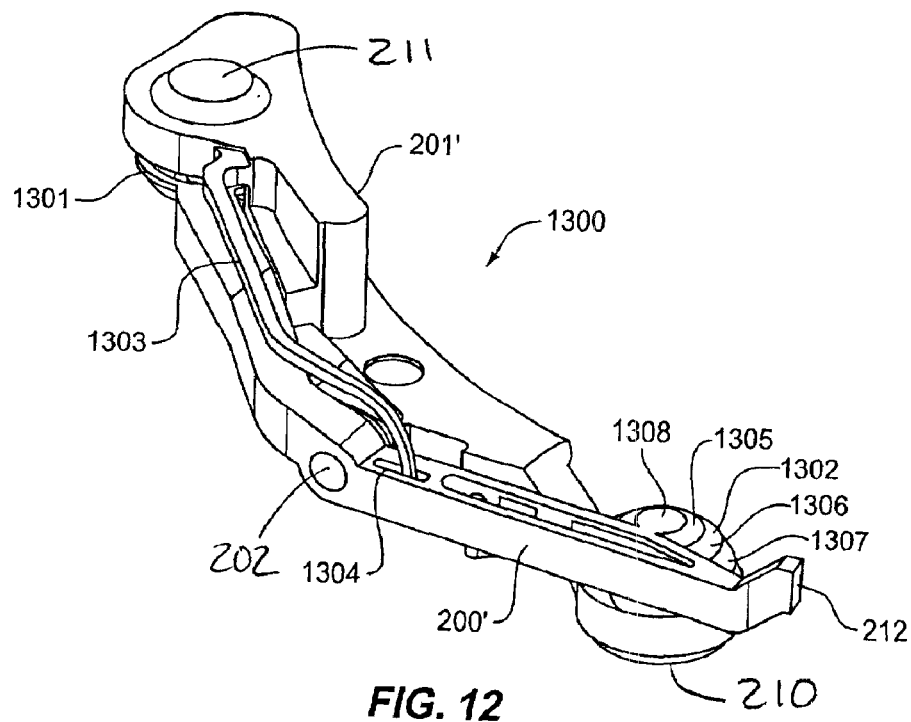
FIG. 12 is a perspective view of another embodiment of a multi-axes shock actuator arm latch assembly that may be used in the disk drive of FIG. 1.
Figure 13:
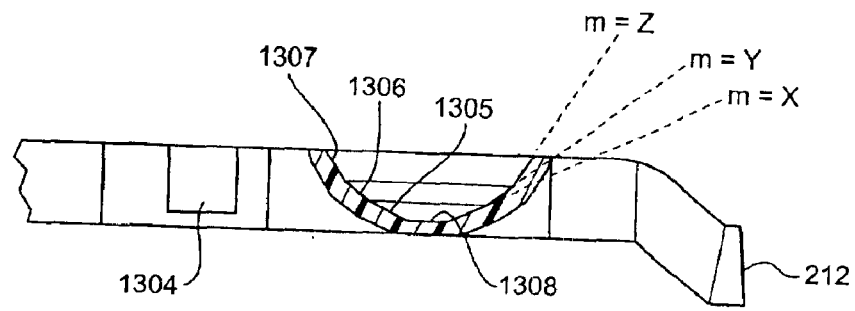
FIG. 13 is a cross-sectional view of a cup of a pivotal latch member of the actuator arm latch assembly of FIG. 12.
Figure 14:
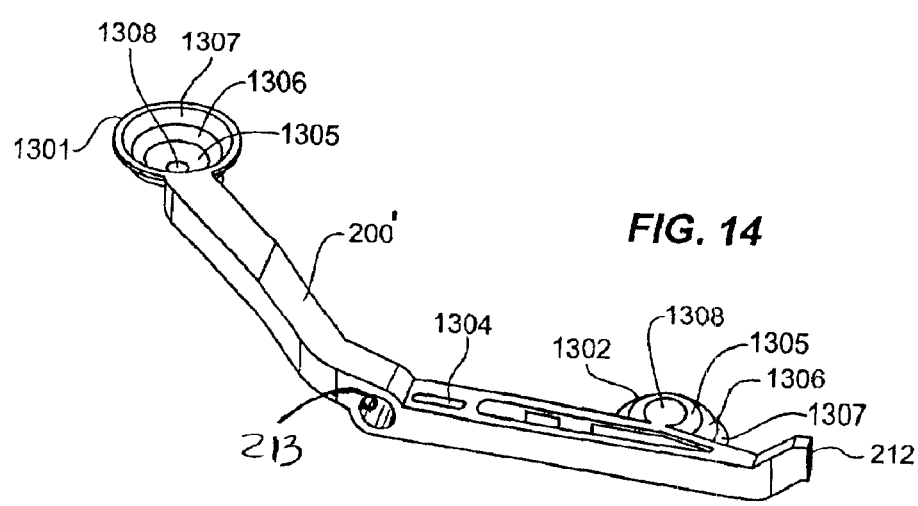
FIG. 14 is a perspective view of the pivotal latch member of the actuator arm latch assembly of FIG. 12.

FIGS. 12–14 illustrate another embodiment of a multi-axes shock actuator arm latch assembly 1300 that may be used in place of the actuator arm latch assembly 101. Corresponding components of these embodiments may use similar reference numerals. A single "prime" designation is used to identify that there is at least one difference in the corresponding structure.

The actuator arm latch assembly 1300 is identical in operation and substantially similar in design to the actuator arm latch assembly 101, with the exception of the bias member 1303 and the cups 1301 and 1302 on the pivotal latch member 200'. In this embodiment, the bias member 1303 is an integrally formed spring in the fixed latch member 201'. That is, the bias member 1303 is formed from the same material and at the same time as the rest of the fixed latch member 201'. The bias member 1303 extends horizontally out of the top portion and in parallel relation to the fixed latch member 201' and follows the curvature of the latch member 201' to directly engage the pivotal latch member 200' in the aperture 1304. The bias member 1303 provides the advantage of simplifying the construction of the actuator arm latch assembly 101. The bias member 1303 also provides the advantage of providing additional guidance in the vertical direction during rotation of the pivotal latch member 200', as it always remains engaged within the aperture 1304.

Also in this embodiment, the cups 1301 and 1302 of the pivotal latch member 200' each include a base 1308 that engages the upper or lower extreme of the corresponding inertial mass 206, 207, and an annular sidewall. Each sidewall of the cups 1301, 1302 is defined by a plurality of annular facets 1305–1307. Although three of such facets 1305–1307 are illustrated, any number of facets may be utilized. Generally, the further a given facet is from the base 1308 of the corresponding cup 1301, 1302, the greater its slope. That is and for the case of the illustrated embodiment, the facet 1305 has have a slope (m) equal to X, while the facet 1306 has a slope (m) equal to Y that is larger than X, and the facet 1307 has a slope (m) equal to Z that is larger than Y. In one embodiment, the slope (m) of the facet 305 may be in the range of about 10 to about 20, the slope (m) of the facet 1306 may be in the range of about 20 to about 50, and the slope (m) of the facet 1307 may be in the range of about 30 to about 60.

The facets 1305–1307, including the slope changes, cause the corresponding inertial masses 206 and 207 to rapidly displace within the corresponding cup 1301, 1302 when a force is exerted on the disk drive 100. The facets 1305–1307, including the slope changes, also permit construction of the cups 301 and 1302, with a small outer diameter to allow for packaging and the limited space within the disk drive 100.

Typically, the cup 1301 would include identically formed and sloped facets. Alternatively, however, it will be appreciated that numerous other combinations of slopes could be used to achieve different response characteristics of the actuator arm latch assembly 1300. Furthermore, the cups 1301 and 1302 could include different combinations of facet slopes to increase or decrease the responses of the inertial masses 206 and 207 within the cups 1301 and 1302. In addition, more or less facets could be incorporated into the cups 1301 and 1302 as a matter of design choice to vary the response characteristics of the actuator arm latch assembly 1300. Advantageously, the faceted cup design permits finite tuning of the actuator arm latch assembly 1300 by changing the slope angles and number of faucets within the cups 1301 and 1302. Those skilled in the art will appreciate that the tuning characteristics described in connection with the actuator latch assembly 101 could also be combined with tuning using the facets 1305–1307 to achieve numerous other response characteristics of the actuator arm latch assembly 1300. For example, changing the density of the inertial masses, 206 and 207, the rigidity of the bias member 1303, the location of the cups 1302 and 1301 or the length of the latch members 200' and 201', all could all be used to achieve various response characteristics.

The various features that exist in the actuator arm assembly 101 may be incorporated into the actuator arm latch assembly 1300, and vice versa. For instance, the actuator arm latch assembly 101 could use the bias member 1303 versus the bias member 204, could use the cups 1301, 1302 versus the cups 208, 209, could have the cup 210 configured the same as cup 211, or any combination thereof. Moreover, the actuator arm latch assembly 1300 could use the bias member 204 versus the bias member 1303, could use the cups 208, 209 versus the cups 1301, 1302, could have both cups for the fixed latch member 201' configured as for the fixed latch member 201 of the actuator arm latch assembly 101, or any combination thereof.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive, comprising:
   a housing;
   at least one data storage disk movably interconnected with said housing;
   an actuator arm assembly movably interconnected with said housing by an actuator arm pivot;
   an actuator arm drive assembly associated with said actuator arm assembly;
   a transducer interconnected with said actuator arm assembly and disposable in alignment with said at least one data storage disk by said actuator arm drive assembly; and
   an actuator arm latch assembly comprising a latch pivot and a first latch member movably mounted on said latch pivot, wherein said latch pivot is disposed in non-parallel relation to said actuator arm pivot, and wherein said first latch member moves from a non-latching position to a latching position in response to said disk drive being exposed to a first force and while said transducer is in a parked position, wherein said at least one data storage disk is movably interconnected with said housing within a first reference plane, wherein a second reference plane is perpendicular to said first reference plane, and wherein said actuator arm latch assembly comprises means for latching said actuator arm assembly both when said disk drive is exposed to a force having at least a primary component that is within said first reference plane and when said disk drive is exposed to a force having a primary component that is within said second reference plane.

2. The disk drive of claim 1, wherein said housing comprises a base plate.

3. The disk drive of claim 1, wherein said actuator arm assembly is a rotary actuator arm assembly.

4. The disk drive of claim 1, wherein said transducer is a read/write transducer.

5. The disk drive of claim 1, wherein said housing comprises a base plate, wherein said first latch member comprises a latch, wherein said first latch member is movable between said non-latching position and said latching position about said latch pivot, and wherein said latch is disposed further from said base plate when said first latch member is in said latching position versus said non-latching position.

6. The disk drive of claim 1, wherein said first latch member comprises a first cup and a latch, wherein said actuator arm latch assembly further comprises a first inertial mass that is at least partially disposed within said first cup.

7. The disk drive of claim 6, wherein said housing comprises a base plate, and wherein said first cup opens at least generally toward said base plate.

8. The disk drive of claim 6, wherein said first cup comprises an annular sidewall that is disposed about a first reference axis, wherein said annular sidewall comprises a plurality of annular, planar facets having different slopes.

9. The disk drive of claim 6, wherein said first latch member comprises a second cup, wherein said first and second cups are disposed on opposite sides of said latch pivot.

10. The disk drive of claim 9, wherein said housing comprises a base plate, and wherein said first cup opens at least generally toward said base plate and said second cup opens at least generally away from said base plate.

11. The disk drive of claim 1, wherein said housing comprises a base plate, and wherein said actuator arm latch assembly comprises means for latching said actuator arm assembly when said disk drive is exposed to a force having a primary component that is at least generally parallel with said base plate, as well as when said disk drive is exposed to a force having a primary component that is at least generally perpendicular to said base plate.

12. The disk drive of claim 1, wherein said actuator arm latch assembly comprises means for latching said actuator arm assembly when said disk drive is exposed to a force selected from the group consisting of a linear force, a rotational force, and any combination thereof.

13. The disk drive of claim 1, wherein a primary axis of said latch pivot is disposed within a first reference plane that is at least generally perpendicular to a second reference plane that contains a primary axis of said actuator arm pivot.

14. The disk drive of claim 1, wherein said actuator arm latch assembly comprises means for biasing said first latch member to said non-latching position.

15. The disk drive of claim 1, wherein said actuator arm latch assembly comprises a second latch member fixedly mounted to said housing, whereby said second latch member does not move relative to said housing.

16. The disk drive of claim 15, wherein said latch pivot is integrally formed with said second latch member.

17. The disk drive of claim 15, wherein said first and second latch members are plastic.

18. The disk drive of claim 15, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, wherein said actuator arm latch assembly further comprises first and second inertial masses disposed between said first and third cups and between said second and fourth cups, respectively.

19. The disk drive of claim 15, wherein said first latch member comprises a first cup and a latch that is engageable with said actuator arm assembly, wherein said second latch member comprises a second cup, wherein said first and second cups at least generally open toward each other, wherein said actuator arm latch assembly comprises a first inertial mass disposed between said first and second cups, and wherein said first and second cups are of a different configuration.

20. The disk drive of claim 19, wherein said second cup is at least generally trough-shaped.

21. The disk drive of claim 19, wherein said second cup is elongated in a direction that is parallel to a portion of said first latch member that has said latch.

22. The disk drive of claim 1, wherein said actuator arm latch assembly further comprises a first inertial mass, wherein an acceleration of said first inertial mass due to said first force causes said first inertial mass to exert a force on said first latch member that attempts to move said first latch member from said non-latching position to said latching position.

23. A disk drive, comprising:
a housing comprising a base plate;
at least one data storage disk movably interconnected with said housing;
an actuator arm assembly movably interconnected with said housing;
an actuator arm drive assembly associated with said actuator arm assembly;
a transducer interconnected with said actuator arm assembly and disposable in alignment with said at least one data storage disk by said actuator arm drive assembly; and
an actuator arm latch assembly comprising a first latch member that comprises a latch and that is movable between non-latching and latching positions, wherein said latch of said first latch member is disposed further from said base plate when said first latch member is in said latching position versus said non-latching position, and wherein said first latch member moves from said non-latching position to said latching position in response to said disk drive being exposed to a first force and while said transducer is in a parked position, wherein said at least one data storage disk is movably interconnected with said housing within a first reference plane, wherein a second reference plane is perpendicular to said first reference plan, and wherein said actuator arm latch assembly comprises means for latching said actuator arm assembly both when said disk drive is exposed to a force having a primary component that is within said first reference plane and when said disk drive is exposed to a force having a primary component that is within said second reference plane.

24. The disk drive of claim 23, wherein said actuator arm latch assembly comprises a latch pivot, wherein said first latch member is movably mounted on said latch pivot, and wherein said latch pivot is disposed in non-parallel relation to an axis about which said actuator arm assembly moves.

25. The disk drive of claim 23, wherein said actuator arm latch assembly comprises a latch pivot, wherein said first latch member is movably mounted on said latch pivot, wherein said actuator arm assembly is mounted on an actuator arm pivot, wherein a primary axis of said latch pivot is disposed within a first reference plane that is at least generally perpendicular to a second reference plane that contains a primary axis of said actuator arm pivot.

26. The disk drive of claim 23, wherein said first latch member comprises a first cup, wherein said actuator arm latch assembly further comprises a first inertial mass that is at least partially disposed within said first cup.

27. The disk drive of claim 26, wherein said first cup opens at least generally toward said base plate.

28. The disk drive of claim 26, wherein said first cup comprises a planar base and an annular sidewall.

29. The disk drive of claim 26, wherein said first cup comprises an annular sidewall that is disposed about a first reference axis, wherein said annular sidewall comprises a plurality of annular, planar facets having different slopes.

30. The disk drive of claim 26, wherein said first latch member comprises a second cup, wherein said first and second cups are disposed on opposite sides of said latch pivot.

31. The disk drive of claim 30, wherein said first cup opens at least generally toward said base plate and said second cup opens at least generally away from said base plate.

32. The disk drive of claim 23, wherein said actuator arm latch assembly comprises means for latching said actuator arm assembly when said disk drive is exposed to a force having a primary component that is at least generally parallel with said base plate, as well as when said disk drive its exposed to a force having a primary component that is at least generally perpendicular to said base plate.

33. The disk drive of claim 23, wherein said actuator arm latch assembly comprises means for latching said actuator arm assembly when said disk drive is exposed to a force selected from the group consisting of a linear force, a rotational force, and any combination thereof.

34. The disk drive of claim 23, wherein said actuator arm latch assembly comprises means for biasing said first latch member to said non-latching position.

35. The disk drive of claim 23, wherein said actuator arm latch assembly comprises a second latch member fixedly mounted to said base plate, whereby said second latch member does not move relative to said base plate.

36. The disk drive of claim 35, wherein said latch pivot is integrally formed with said second latch member.

37. The disk drive of claim 35, wherein said first and second latch members are plastic.

38. The disk drive of claim 35, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, wherein said actuator arm latch assembly further comprises first and second inertial masses disposed between said first and third cups and between said second and fourth cups, respectively.

39. The disk drive of claim 38, wherein said second cup is at least generally trough-shaped.

40. The disk drive of claim 38, wherein said second cup defines a first cavity having a length dimension and a width dimension, wherein said length dimension is greater than said width dimension and further is greater than a diameter of said first inertial mass.

41. The disk drive of claim 38, wherein said third cup has a different configuration than said first cup.

42. The disk drive of claim 23, wherein said actuator arm latch assembly further comprises a first inertial mass, wherein an acceleration of said first inertial mass due to said first force causes said first inertial mass to exert a force on said first latch member that attempts to move said first latch member from said non-latching position to said latching position.

43. A disk drive, comprising:
   a housing;
   at least one data storage disk movably interconnected with said housing;
   an actuator arm assembly movably interconnected with said housing;
   an actuator arm drive assembly associated with said actuator arm assembly;
   a transducer interconnected with said actuator arm assembly and disposable in alignment with said at least one data storage disk by said actuator arm drive assembly; and
   an actuator arm latch assembly comprising a latch pivot and a first latch member movably mounted on said latch pivot, wherein said first latch member comprises a first cup and a latch, wherein said actuator arm latch assembly further comprises a first inertial mass at least partially disposed within said first cup, and wherein said first latch member moves from a non-latching position to a latching position in response to said disk drive being exposed to a first force and while said transducer is in a parked position.

44. The disk drive of claim 43, wherein said housing comprises a base plate, and wherein said actuator arm latch assembly comprises a second latch member fixedly mounted to said base plate, whereby said second latch member does not move relative to said base plate.

45. The disk drive of claim 44, wherein said latch pivot is integrally formed with said second latch member.

46. The disk drive of claim 44, wherein said first and second latch members are plastic.

47. The disk drive of claim 44, wherein said first latch member comprises a second cup, wherein said first and second cups are disposed on opposite sides of said latch pivot, wherein said second latch member comprises third and fourth cups disposed on opposite sides of said latch pivot and at least generally vertically aligned with said first and second cups, respectively, wherein said actuator arm latch assembly further comprises a second inertial mass, wherein said first inertial mass is disposed between said first and third cups and said second inertial mass is disposed between said second and fourth cups, respectively.

48. The disk drive of claim 47, wherein said first cup opens at least generally toward said base plate, said second cup opens at least generally away from said base plate, said third cup opens at least generally away from said base plate, and said fourth cup opens at least generally toward said base plate.

49. The disk drive of claim 43, wherein said actuator arm latch assembly further comprises a first inertial mass, wherein an acceleration of said first inertial mass due to said first force causes said first inertial mass to exert a force on said first latch member that attempts to move said first latch member from said non-latching position to said latching position.

50. A method for reducing a potential for undesired contact between a head and a data storage disk of a disk drive, comprising the steps of:
   parking said head;
   exposing said disk drive to a first shock event having at least a primary component that is at least generally parallel to said data storage disk, wherein said exposing said disk drive to a first shock event step is executed after said parking step;
   executing a first precluding step comprising precluding said head from moving across said data storage disk as a result of said exposing said disk drive to a first shock event step, wherein said first precluding step comprises moving a first latching member from a non-latching position to a latching position in response to said first shock event step;
   exposing said disk drive to a second shock event having at least a primary component that is at least generally perpendicular to said data storage disk, wherein said exposing said disk drive to a second shock event step is executed after said parking step; and
   executing a second precluding step comprising precluding said head from moving across said data storage disk as a result of said exposing said disk drive to a second shock event step, wherein said second precluding step comprises moving said first latching member from said non-latching position to said latching position in response to said second shock event step.

51. The method of claim 50, wherein said parking step comprises disposing said head beyond a perimeter of said data storage disk.

52. The method of claim 50, wherein said parking step comprises disposing said head on said data storage disk.

53. The method of claim 50, wherein said executing first and second precluding steps each comprise moving a latch of said first latching member at least generally in an upward direction.

54. The method of claim 50, wherein said executing first and second precluding steps each comprise pivoting said first latching member about a first reference axis that is disposed in non-parallel relation to a data storage surface of said data storage disk.

55. The method of claim 50, wherein said data storage disk rotates about a first reference axis, wherein said executing first and second precluding steps each comprise pivoting said first latching member about a second reference axis, and wherein said first and second reference axes are contained within first and second reference planes that are disposed in at least generally perpendicular relation.

56. The method of claim 50, wherein an actuator arm assembly latch comprises first and second inertial masses, wherein said executing a first precluding step uses both of said first and second inertial masses, and wherein said executing a second precluding step uses said first inertial mass but not said second inertial mass.

57. A disk drive, comprising:
a housing;
a first data storage disk movably interconnected with said housing;
an actuator arm assembly movably interconnected with said housing;
an actuator arm drive assembly associated with said actuator arm assembly;
a transducer interconnected with said actuator arm assembly and disposable in alignment with said first data storage disk by said actuator arm drive assembly; and
an actuator arm latch assembly comprising a latch pivot, a first latch member movably mounted on said latch pivot, and a second latch member, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, and wherein said actuator arm latch assembly further comprises first and second inertial masses disposed between said first and third cups and between said second and fourth cups, respectively.

58. The disk drive of claim 57, wherein:
said second latch member is stationary relative to said housing.

59. A disk drive, comprising:
a housing;
a first data storage disk movably interconnected with said housing;
an actuator arm assembly movably interconnected with said housing;
an actuator arm drive assembly associated with said actuator arm assembly;
a transducer interconnected with said actuator arm assembly and disposable in alignment with said first data storage disk by said actuator arm drive assembly; and
an actuator arm latch assembly comprising, a latch pivot, a first latch member movably mounted on said latch pivot, and first and second inertial masses, wherein an acceleration of both said first and second inertial masses causes said first and second inertial masses to exert a force on said first latch member that attempts to move said first latch member in response to a first force being exerted on said disk drive, and wherein an acceleration of only said second inertial mass causes said second inertial mass to exert a force on said first latch member that attempts to move said first latch member in response to a second force being exerted on said disk drive that is different from said first force.

60. The disk drive of claim 59, wherein said actuator arm latch assembly further comprises a second latch member.

61. The disk drive of claim 60, wherein said second latch member is stationary relative to said housing.

62. The disk drive of claim 61, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, wherein said first and second inertial masses are disposed between said first and third cups and between said second and fourth cups, respectively.

63. The disk drive of claim 60, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, wherein said first and second inertial masses are disposed between said first and third cups and between said second and fourth cups, respectively.

64. A disk drive, comprising:
a housing;
at least one data storage disk movably interconnected with said housing;
an actuator arm assembly movably interconnected with said housing by an actuator arm pivot;
an actuator arm drive assembly interconnected with said actuator arm assembly;
a transducer interconnected with said actuator arm assembly and disposable in alignment with said at least one data storage disk by said actuator arm drive assembly; and
an actuator arm latch assembly comprising a latch pivot and a first latch member movably mounted on said latch pivot, wherein said latch pivot is disposed in non-parallel relation to said actuator arm pivot, wherein said first latch member comprises a first cup and a latch, wherein said actuator arm latch assembly further comprises a first inertial mass that is at least partially disposed within said first cup, wherein said housing comprises a base plate, and wherein said first cup opens at least generally toward said base plate.

65. A disk drive, comprising:
a housing;
at least one data storage disk movably interconnected with said housing;
an actuator arm assembly movably interconnected with said housing by an actuator arm pivot;
an actuator arm drive assembly interconnected with said actuator arm assembly;
a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said latch pivot is disposed in non-parallel relation to said actuator arm pivot, wherein said first latch member comprises a first cup and a latch, wherein said actuator arm latch assembly further comprises a first inertial mass that is at least partially disposed within said first cup, wherein said first cup comprises an annular sidewall that is disposed about a first reference axis, wherein said annular sidewall comprises a plurality of annular, planar facets having different slopes.

66. A disk drive, comprising:

a housing;

at least one data storage disk movably interconnected with said housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said latch pivot is disposed in non-parallel relation to said actuator arm pivot, wherein said first latch member comprises a first cup and a latch, wherein said actuator arm latch assembly further comprises a first inertial mass that is at least partially disposed within said first cup, wherein said first latch member comprises a second cup, wherein said first and second cups are disposed on opposite sides of said latch pivot.

67. The disk drive of claim 66, wherein said housing comprises a base plate, and wherein said first cup opens at least generally toward said base plate and said second cup opens at least generally away from said base plate.

68. A disk drive, comprising:

a housing;

at least one data storage disk movably interconnected with said housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said latch pivot is disposed in non-parallel relation to said actuator arm pivot, wherein said actuator arm latch assembly comprises a second latch member fixedly mounted to said housing, whereby said second latch member does not move relative to said housing, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, wherein said actuator arm latch assembly further comprises first and second inertial masses disposed between said first and third cups and between said second and fourth cups, respectively.

69. A disk drive, comprising:

a housing;

at least one data storage disk movably interconnected with said housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said latch pivot is disposed in non-parallel relation to said actuator arm pivot, wherein said actuator arm latch assembly comprises a second latch member fixedly mounted to said housing, whereby said second latch member does not move relative to said housing, wherein said first latch member comprises a first cup and a latch that is engageable with said actuator arm assembly, wherein said second latch member comprises a second cup, wherein said first and second cups at least generally open toward each other, wherein said actuator arm latch assembly comprises a first inertial mass disposed between said first and second cups, and wherein said first and second cups are of a different configuration.

70. The disk drive of claim 69, wherein said second cup is at least generally trough-shaped.

71. The disk drive of claim 69, wherein said second cup is elongated in a direction that is parallel to a portion of said first latch member that has said latch.

72. A disk drive, comprising:

a base plate;

at least one data storage disk movably interconnected with the housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on the latch pivot, wherein said first latch member comprises a latch, wherein said first latch member is movable between non-latching and latching positions about said latch pivot, wherein said latch of said first latch member is disposed further from said base plate when said first latch member is in said latching position versus said non-latching position, wherein said first latch member comprises a first cup and a latch, wherein said actuator arm latch assembly further comprises a first inertial mass that is at least partially disposed within said first cup, wherein said first cup opens at least generally toward said base plate.

73. A disk drive, comprising:

a base plate;

at least one data storage disk movably interconnected with the housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on the latch pivot, wherein said first latch member comprises a latch, wherein said first latch member is movable between non-latching and latching positions about said latch pivot, wherein said latch of said first latch member is disposed further from said base plate when said first latch member is in said latching position versus said non-latching position, wherein said first latch member comprises a first cup and a latch, wherein said actuator arm latch assembly further comprises a first inertial mass that is at least partially disposed within said first cup, wherein said first cup comprises an annular sidewall that is disposed about a first reference axis, wherein said annular sidewall comprises a plurality of annular, planar facets having different slopes.

74. A disk drive, comprising:

a base plate;

at least one data storage disk movably interconnected with the housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on the latch pivot, wherein said first latch member comprises a latch, wherein said first latch member is movable between non-latching and latching positions about said latch pivot, wherein said latch of said first latch member is disposed further from said base plate when said first latch member is in said latching position versus said non-latching position, wherein said first latch member comprises a first cup and a latch, wherein said actuator arm latch assembly further comprises a first inertial mass that is at least partially disposed within said first cup, wherein said first latch member comprises a second cup, wherein said first and second cups are disposed on opposite sides of said latch pivot.

75. The disk drive of claim 74, wherein said first cup opens at least generally toward said base plate and said second cup opens at least generally away from said base plate.

76. A disk drive, comprising:

a base plate;

at least one data storage disk movably interconnected with the housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on the latch pivot, wherein said first latch member comprises a latch, wherein said first latch member is movable between non-latching and latching positions about said latch pivot, wherein said latch of said first latch member is disposed further from said base plate when said first latch member is in said latching position versus said non-latching position, wherein said actuator arm latch assembly comprises a second latch member fixedly mounted to said base plate, whereby said second latch member does not move relative to said base plate, wherein said first latch member comprises first and second cups disposed on opposite sides of said latch pivot, wherein said second latch member comprises third and fourth cups disposed on opposite sides of said latch pivot and at least generally vertically aligned with said first and second cups, respectively, wherein said actuator arm latch assembly further comprises first and second inertial masses disposed between said first and third cups and between said second and fourth cups, respectively.

77. The disk drive of claim 76, wherein said second cup is at least generally trough-shaped.

78. The disk drive of claim 76, wherein said second cup defines a first cavity having a length dimension and a width dimension, wherein said length dimension is greater than said width dimension and further is greater than a diameter of said first inertial mass.

79. The disk drive of claim 76, wherein said third cup has a different configuration than said first cup.

80. A disk drive, comprising:

a housing;

at least one data storage disk movably interconnected with said housing;

an actuator arm assembly movably interconnected with said housing by an actuator arm pivot;

an actuator arm drive assembly interconnected with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said first latch member comprises a first cup and a latch, wherein said actuator arm latch assembly further comprises a first inertial mass at least partially disposed within said first cup, wherein said housing comprises a base plate, and wherein said actuator arm latch assembly comprises a second latch member fixedly mounted to said base plate, whereby said second latch member does not move relative to said base plate, wherein said first latch member comprises a second cup, wherein said first and second cups are disposed on opposite sides of said latch pivot, wherein said second latch member comprises third and fourth cups disposed on opposite sides of said latch pivot and at least generally vertically aligned with said first and second cups, respectively, wherein said actuator arm latch assembly further comprises a second inertial mass, wherein said first inertial mass is disposed between said first and third cups and said second inertial mass is disposed between said second and fourth cups, respectively.

81. The disk drive of claim 80, wherein said first cup opens at least generally toward said base plate, said second cup opens at least generally away from said base plate, said third cup opens at least generally away from said base plate, and said fourth cup opens at least generally toward said base plate.

82. A method for reducing a potential for undesired contact between a head and a data storage disk of a disk drive, comprising the steps of:

parking said head;

exposing said disk drive to a first force having at least a primary component that is at least generally parallel to said data storage disk, wherein said exposing said disk drive to a first force step is executed after said parking step;

executing a first precluding step comprising precluding said head from moving across said data storage disk as a result of said exposing said disk drive to a first force step;

exposing said disk drive to a second force having at least a primary component that is at least generally perpendicular to said data storage disk, wherein said exposing said disk drive to a second force step is executed after said parking step; and executing a second precluding step comprising precluding said head from moving across said data storage disk as a result of said exposing said disk drive to a second force step, wherein an actuator arm assembly latch comprises first and second inertial masses, wherein said executing a first precluding step uses both of said first and second inertial masses, and wherein said executing a second precluding step uses said first inertial mass but not said second inertial mass.

83. A disk drive, comprising:

a housing;

at least one data storage disk movably interconnected with said housing;

an actuator arm assembly movably interconnected with said housing by an actuator arm pivot;

an actuator arm drive assembly associated with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said latch pivot is disposed in non-parallel relation to said actuator arm pivot, and wherein said first latch member moves from a non-latching position to a latching position only in response to said disk drive being exposed to a shock event, wherein said housing comprises a base plate, and wherein said actuator arm latch assembly comprises means for latching said actuator arm assembly when said disk drive is exposed to a force having a primary component that is at least generally parallel with said base plate, as well as when said disk drive is exposed to a force having a primary component that is at least generally perpendicular to said base plate.

84. A disk drive, comprising:

a housing comprising a base plate;

at least one data storage disk movably interconnected with said housing;

an actuator arm assembly movably interconnected with said housing;

an actuator arm drive assembly associated with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said first latch member comprises a latch, wherein said first latch member is movable between non-latching and latching positions about said latch pivot, wherein said latch of said first latch member is disposed further from said base plate when said first latch member is in said latching position versus said non-latching position, and wherein said first latch member moves from said non-latching position to said latching position only in response to said disk drive being exposed to a shock event, wherein said actuator arm latch assembly comprises means for latching said actuator arm assembly when said disk drive is exposed to a force having a primary component that is at least generally parallel with said base plate, as well as when said disk drive is exposed to a force having a primary component that is at least generally perpendicular to said base plate.

85. A disk drive, comprising:

a housing;

at least one data storage disk movably interconnected with said housing;

an actuator arm assembly movably interconnected with said housing;

an actuator arm drive assembly associated with said actuator arm assembly;

a transducer interconnected with said actuator arm assembly and disposable in alignment with said at least one data storage disk by said actuator arm drive assembly; and an actuator arm latch assembly comprising a latch pivot and a first latch member movably mounted on said latch pivot, wherein said first latch member comprises a first cup and a latch, wherein said actuator arm latch assembly further comprises a first inertial mass at least partially disposed within said first cup, and wherein said first latch member moves from a non-latching position to a latching position only in response to said disk drive experiencing a shock event.

* * * * *